(12) United States Patent
Hiruma

(10) Patent No.: US 8,970,874 B2
(45) Date of Patent: Mar. 3, 2015

(54) INFORMATION PROCESSING APPARATUS, METHOD OF CONTROLLING THE SAME, AND STORAGE MEDIUM

(75) Inventor: Junichi Hiruma, Hidaka (JP)

(73) Assignee: Canon Kabuhiki Kaisha, Tokyo (JP)

( * ) Notice: Subject to any disclaimer, the term of this patent is extended or adjusted under 35 U.S.C. 154(b) by 676 days.

(21) Appl. No.: 12/961,940

(22) Filed: Dec. 7, 2010

(65) Prior Publication Data

US 2011/0157633 A1    Jun. 30, 2011

(30) Foreign Application Priority Data

Dec. 28, 2009   (JP) ................................. 2009-298830

(51) Int. Cl.
G03G 15/00 (2006.01)
G06F 21/62 (2013.01)
G06F 3/12 (2006.01)

(52) U.S. Cl.
CPC .......... G06F 21/6245 (2013.01); *G06F 3/1222* (2013.01); *G06F 3/1238* (2013.01); *G06F 3/1265* (2013.01); *G06F 3/1273* (2013.01); *G06F 3/129* (2013.01); *G06F 3/1292* (2013.01)
USPC ............................ 358/1.15; 358/1.16; 399/80

(58) Field of Classification Search
CPC .............. H04N 2201/3273; H04N 2201/3202; H04N 2201/3212; H04N 1/00514; G06F 3/1273; G06F 3/1222
USPC ................................. 358/1.13–1.16
See application file for complete search history.

(56) References Cited

U.S. PATENT DOCUMENTS

| 7,310,814 | B2 | 12/2007 | Morita et al. |
| 7,613,412 | B2 | 11/2009 | Harada et al. ................... 399/81 |
| 8,294,927 | B2 | 10/2012 | Kunori .......................... 358/1.15 |
| 2006/0101078 | A1 | 5/2006 | Tashiro et al. |
| 2007/0061374 | A1* | 3/2007 | Inakawa et al. ............... 707/200 |
| 2007/0061760 | A1 | 3/2007 | Ikegami ........................ 715/853 |
| 2007/0067680 | A1* | 3/2007 | Harada et al. ................... 714/45 |
| 2007/0070401 | A1 | 3/2007 | Okamoto et al. |
| 2007/0086051 | A1 | 4/2007 | Kunori .......................... 358/1.15 |
| 2008/0046467 | A1* | 2/2008 | Nakajima .................. 707/104.1 |
| 2008/0130044 | A1* | 6/2008 | Yamada ....................... 358/1.15 |
| 2009/0122342 | A1 | 5/2009 | Kawano |

FOREIGN PATENT DOCUMENTS

| CN | 1794778 A | 6/2006 |
| CN | 1936822 A | 3/2007 |

(Continued)

OTHER PUBLICATIONS

Office Action—Chinese Patent Appln. No. 201010621823.8, State Intellectual Property Office of the Peoples' Republic of China, issued Mar. 28, 2013.

*Primary Examiner* — Marivelisse Santiago Cordero
*Assistant Examiner* — Kent Yip
(74) *Attorney, Agent, or Firm* — Fitzpatrick, Cella, Harper & Scinto

(57) ABSTRACT

When displaying an access history, information input from a user's mobile terminal is displayed and catches the eye of many and unspecified persons. In an information processing apparatus according to the present invention, when displaying a plurality of job histories stored, if at least some of pieces of information of the history of a job requested by a mobile terminal is set to non-display, control is performed not to display, out of the plurality of job histories displayed, the at least some of the pieces of information of the history of the job requested by the mobile terminal.

12 Claims, 19 Drawing Sheets

(56) References Cited

FOREIGN PATENT DOCUMENTS

| CN | 101437097 A | 5/2009 |
|---|---|---|
| JP | 2003-233725 A | 8/2003 |
| JP | 2007-058658 A | 3/2007 |
| JP | 2007-087002 A | 4/2007 |
| JP | 2007-141215 A | 6/2007 |
| JP | 2008-003954 A | 1/2008 |
| JP | 2009-134584 A | 6/2009 |

* cited by examiner

FIG. 7

| MANAGEMENT NUMBER | DATE / TIME | RESULT | INPUT | URI(URL) | TERMINAL SPECIFYING ID |
|---|---|---|---|---|---|
| 0001 | 2009/07/01/12:58 | NG | K | http://print/keshiki/gazou.html | AAAAAAAAAA |
| 0002 | 2009/07/01/14:03 | OK | F | http://www.eanon.co.jp | NONE |
| 0003 | 2009/07/01/14:05 | OK | K | http://print/keshiki/gazou.html | AAAAAAAAAA |
| 0004 | 2009/07/01/14:30 | OK | T | http://hoge.net | NONE |

FIG. 8
8A
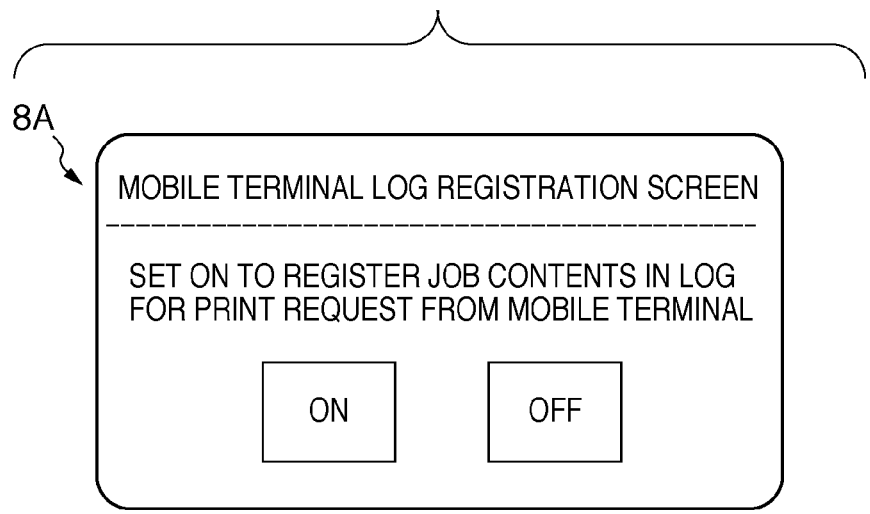
8B
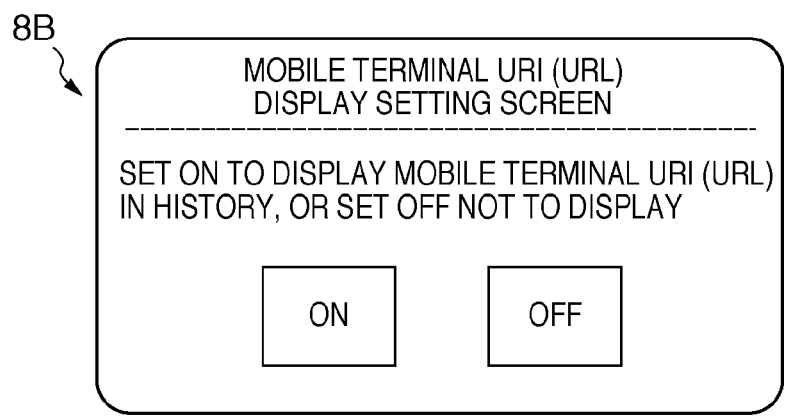
8C
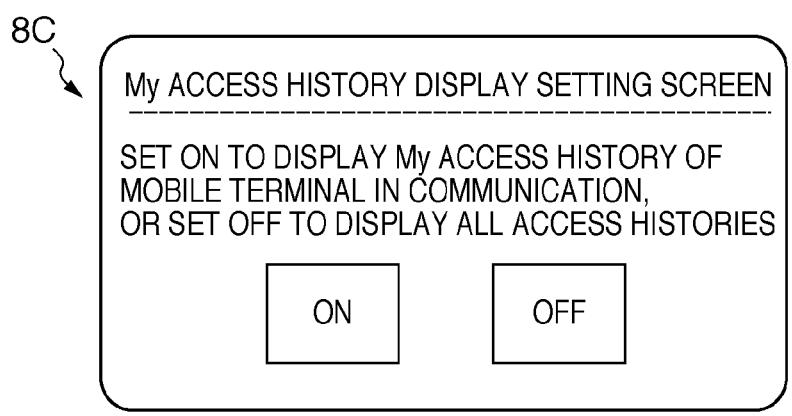

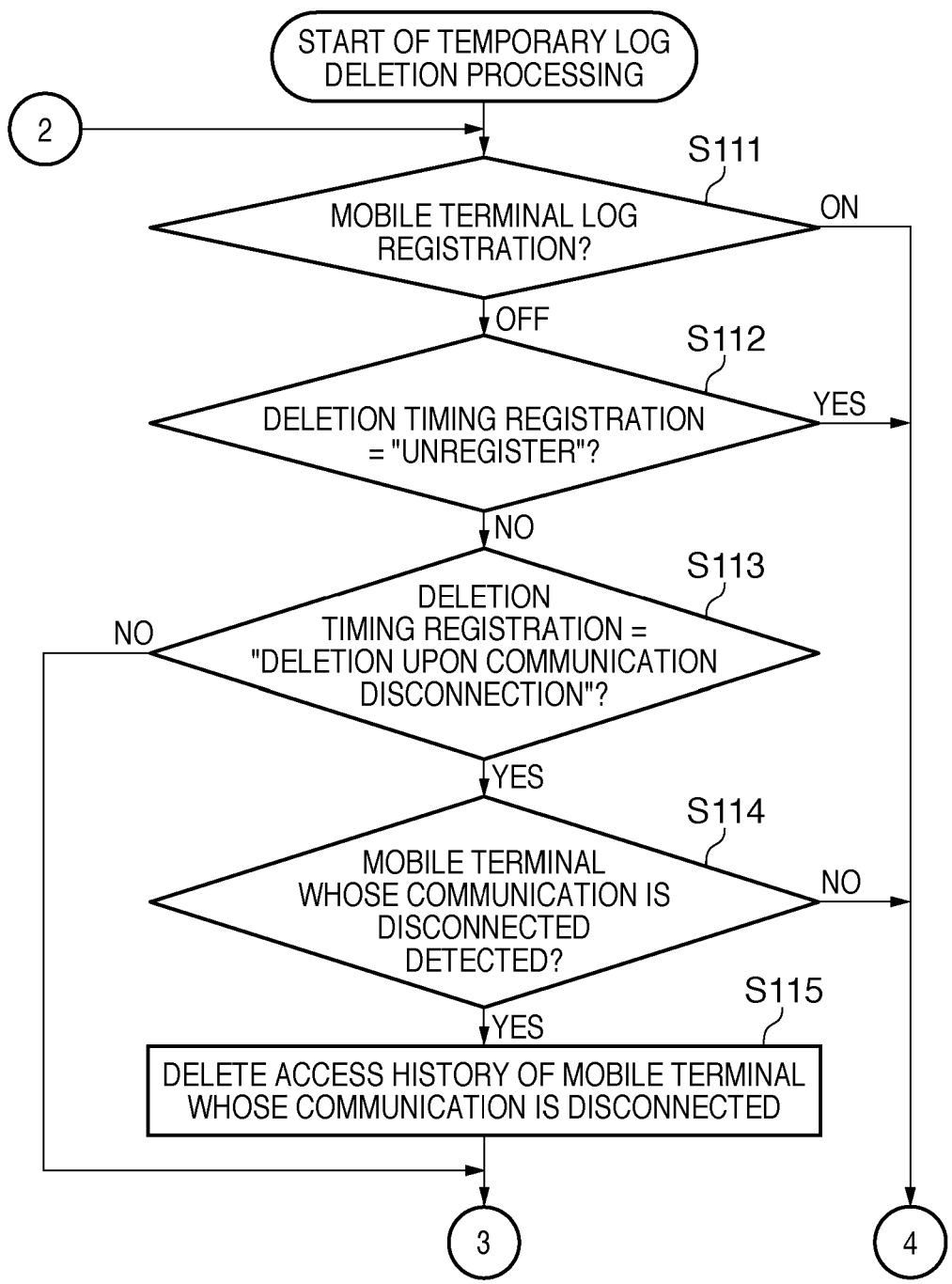

INFORMATION PROCESSING APPARATUS, METHOD OF CONTROLLING THE SAME, AND STORAGE MEDIUM

BACKGROUND OF THE INVENTION

1. Field of the Invention

The present invention relates to a technique of displaying, on a mobile terminal or an information processing apparatus, information about communication between the information processing apparatus and the mobile terminal.

2. Description of the Related Art

In recent years, service providing systems have become popular which provide services such as copy and FAX in convenience stores, copy shops, and the like. Such a service providing system achieves a higher frequency in service use by preventing personal information of users who use the services from leaking to other users without losing convenience for users.

The service providing system uses a multi function peripheral having printer, scanner, and facsimile functions. Japanese Patent Laid-Open No. 2003-233725 describes a multi function peripheral providing a data sending service, which causes a card reader to read the membership card of a user who uses the service, and authenticates the user based on the user ID, password, and expiration date read from the membership card. Only when authenticated, the user is given a permission to operate.

Some MFPs having a function of communicating with a mobile terminal can provide a service to receive a URL registered in an application on the mobile terminal, read out a page to be printed from there, and print the readout page. Such an MFP is often installed in an office, convenience store, station platform, waiting room, or the like, where many and unspecified persons can operate the apparatus. The access history stored in the MFP represents a print job execution result which also includes the result of each job executed by causing the MFP to print page contents based on a URL a mobile terminal has input by communication with the MFP. When the access history is displayed, not only the access history from URLs registered as the favorite of the MFP but also information input from user's mobile terminals are displayed and catch the eye of many and unspecified persons. It is therefore impossible to implement secrecy of user's service use information.

SUMMARY OF THE INVENTION

The present invention has been made in consideration of the above-described problem of the prior art, and provides a technique of implementing secrecy of information input from a mobile terminal.

One aspect of the present invention provides an information processing apparatus having a communication function with a mobile terminal, comprising: storage unit configured to store histories of a plurality of jobs executed by the information processing apparatus, the plurality of jobs including a job requested by the mobile terminal; display unit configured to display the histories of the plurality of jobs stored in the storage unit; setting unit configured to set, when displaying the histories of the plurality of jobs by the display unit, whether or not to cause at least some of pieces of information of the history of the job requested by the mobile terminal to be non-display; and display control unit configured to control, when non-display is set by the setting unit, not to display the at least some of the pieces of information of the history of the job requested by the mobile terminal out of the histories of the plurality of jobs to be displayed on the display unit.

Another aspect of the present invention provides a method of controlling an information processing apparatus having a communication function with a mobile terminal, comprising: storing histories of a plurality of jobs executed by the information processing apparatus, the plurality of the jobs including a job requested by the mobile terminal; displaying the histories of the plurality of jobs stored in the storing; setting, when displaying the histories of the plurality of jobs in the displaying, whether or not to cause at least some of pieces of information of the history of the job requested by the mobile terminal to be non-display; and controlling, when non-display is set in the setting, not to display the at least some of the pieces of information of the history of the job requested by the mobile terminal out of the histories of the plurality of jobs displayed in the displaying.

Still another aspect of the present invention provides a computer-readable storage medium which stores a program for causing a computer to function as an information processing apparatus having a communication function with a mobile terminal, the program causing the computer to function as: storage unit configured to store histories of a plurality of jobs executed by the information processing apparatus, the plurality of jobs including a job requested by the mobile terminal; display unit configured to display the histories of the plurality of jobs stored in the storage unit; setting unit configured to set, when displaying the histories of the plurality of jobs by the display unit, whether or not to cause at least some of pieces of information of the history of the job requested by the mobile terminal to be non-display; and display control unit configured to control, when non-display is set by the setting unit, not to display the at least some of the pieces of information of the history of the job requested by the mobile terminal out of the histories of the plurality of jobs to be displayed on the display unit.

According to the present invention, it is possible to make a secret of, in the history of jobs input from a mobile terminal, information that should be concealed from any person other than the user of the mobile terminal.

Further features of the present invention will become apparent from the following description of exemplary embodiments (with reference to the attached drawings).

BRIEF DESCRIPTION OF THE DRAWINGS

FIG. 7 is a view showing an example of log information generated by the log generation unit of the MFP;

FIG. 8 shows views of examples of UI screens to be used to register log information of the mobile terminal and set access history display;

FIGS. 18A and 18B are flowcharts for explaining processing of deleting the access history in the MFP.

DESCRIPTION OF THE EMBODIMENTS

The embodiment of the present invention will now be described in detail with reference to the accompanying drawings. Note that the embodiment to be described below does not limit the scope of claims of the present invention. All combinations of features described in the embodiment are not always essential to the solving means of the present invention. Note that although, in the embodiment, a multi function peripheral will be exemplified as an information processing apparatus, the present invention is not limited to this.

Figure 1:
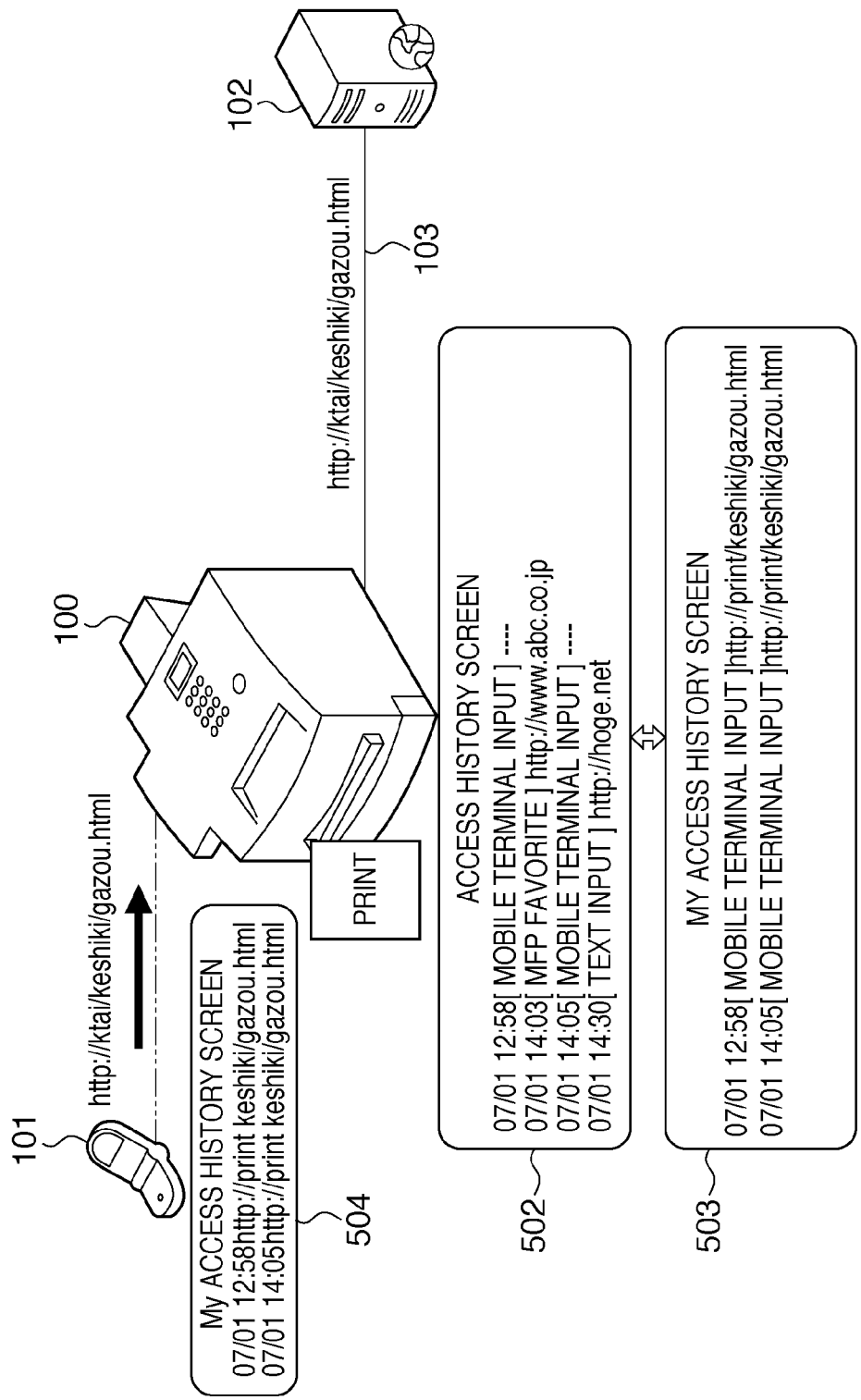
FIG. 1 is a view showing the arrangement of a system according to the embodiment.

FIG. 1 is a view showing the arrangement of a system according to the embodiment. A multi function peripheral (MFP) 100 is installed in a public place such as a copy shop, convenience store, hotel, or station. The MFP 100 has a copy function, scanner function, facsimile function, printer function, communication function, and the like, and can therefore provide a copy service, FAX sending/receiving service, net print service, and the like. The net print service provides a function of printing application data submitted to a Web server and to be used on a wordprocessor or the like. The MFP 100 and a Web server 102 are configured to enable to request/return corresponding Web contents via a network 103. The MFP 100 and a mobile terminal 101 can communicate with each other. The mobile terminal 101 can send, to the MFP 100, the URL of a Web content to be printed. The mobile terminal 101 can also acquire, from the MFP 100, the print history information of a Web contents in the MFP 100.

A screen 504 shows an example of the My access history screen of the mobile terminal 101, which displays the print history information of printing executed in the MFP 100 by the mobile terminal 101. A screen 502 shows an example of the access history screen of the MFP 100, which displays the print history information of printing executed by the MFP 100. A screen 503 shows an example of the My access history screen of the MFP 100, which displays information of a specific user out of the print history information of printing executed by the MFP 100. In the access history displayed on the screen 502, "mobile terminal input" indicates the access history of the mobile terminal 101. In this case, display of URLs designated by the mobile terminal 101 is prohibited.

Figure 2:
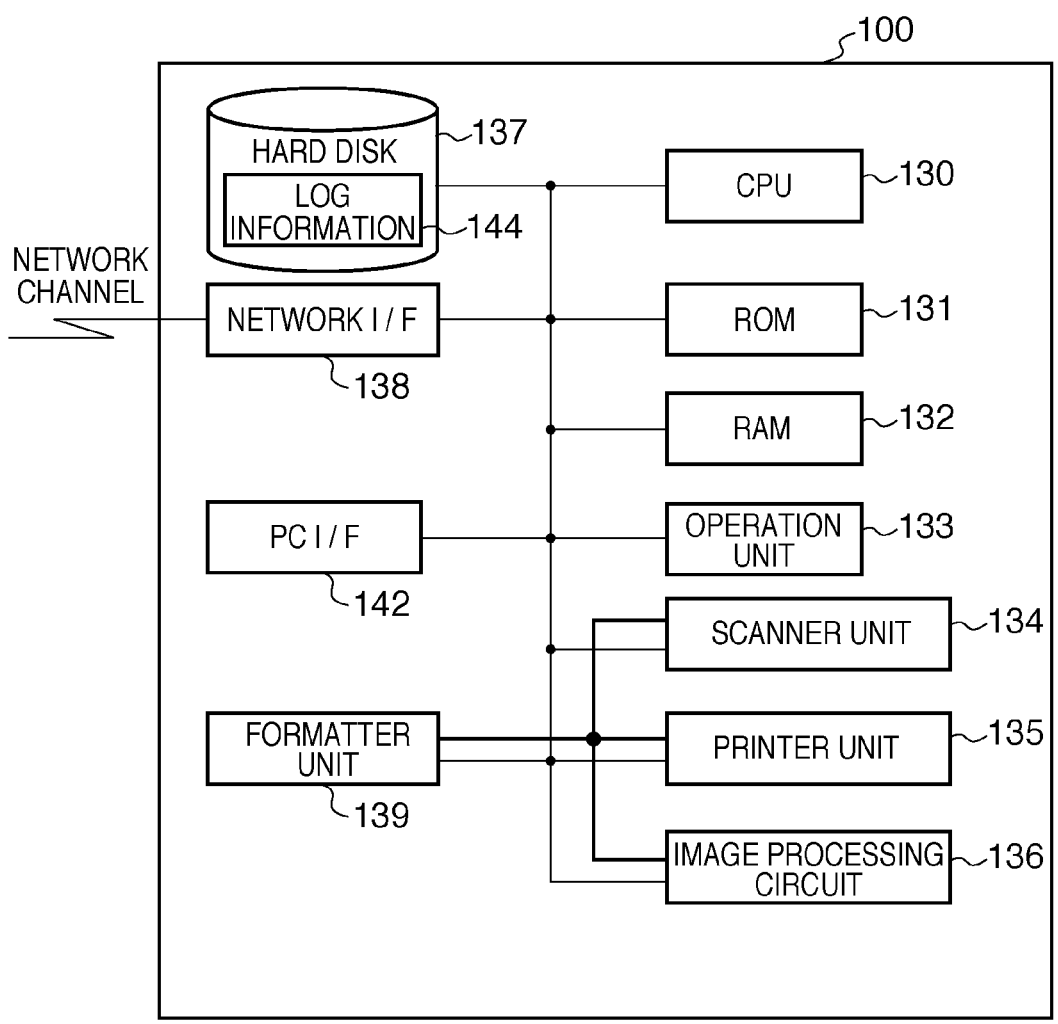
FIG. 2 is a block diagram showing the arrangement of an MFP according to the embodiment.

FIG. 2 is a block diagram showing the arrangement of the MFP 100 according to the embodiment. A CPU 130 controls the entire MFP using a RAM 132 and programs stored in a ROM 131. An operation unit 133 includes a liquid crystal display unit and hard keys such as a start key and ten-key pads. The liquid crystal display unit displays soft keys. When the user touches the keys with his/her fingers, the operation unit 133 accepts the user operations. A scanner unit 134 converts document image data into electrical data by photoelectric conversion. When a document is conveyed from the document feeder to the platen glass, the scanner unit 134 lights the lamp, starts moving the scanner unit, and exposes and scans the document. Light reflected by the document is guided to a CCD sensor via mirrors and lenses, converted into an electrical signal, and further converted into digital data by an A/D conversion circuit. When the document reading operation ends, the document is discharged.

A printer unit 135 prints an image on printing paper based on the image data. A laser emission unit emits a laser beam corresponding to the image data. The laser beam irradiates the photosensitive drum so as to form a latent image corresponding to the laser beam on it. The developing unit applies a developing material (toner) to the latent image portion on the photosensitive drum. Synchronously with the start of laser beam irradiation, a sheet of printing paper is fed from a feed cassette and conveyed to the transfer unit. The transfer unit transfers the developing material applied to the photosensitive drum to the printing paper. The printing paper with the transferred developing material on it is conveyed to the fixing unit. The fixing unit fixes the developing material on the printing paper by heat and pressure. The printing paper passes through the fixing unit, and is discharged by a discharge roller. The sorter places the discharge sheets of printing paper on bins so as to sort the sheets.

An image processing circuit 136 includes a mass image memory, image rotating circuit, resolution scaling circuit, and encoding/deciding circuits of MH, MR, MMR, JBIG, JPEG, and the like. The image processing circuit 136 can also execute various kinds of image processing such as shading, trimming, and masking. A hard disk 137 is a mass storage medium connected via an interface such as SCSI or IDE. A network I/F 138 is an interface represented by 10BASE-T or 100BASE-T which connects the MFP 100 to a network channel such as Ethernet® or token ring. A formatter unit 139 creates image data from PDL (Page Description Language) data. The formatter unit 139 renders image data received from a personal computer via a parallel interface complying with IEEE1284, a PC I/F 142 that is a serial interface such as a USB, or the network I/F 138. The rendered image undergoes image processing of the image processing circuit 136, and is printed by the printer unit 135. The scanner unit 134, printer unit 135, image processing circuit 136, and formatter unit 139 are connected via a high-speed video bus different from the CPU bus from the CPU 130 so as to enable high-speed transfer of image data. Image data obtained by causing the scanner unit 134 to read a document is processed by the image processing circuit 136 and printed by the printer unit 135, thereby implementing the copy function. Log information 144 is the information of use histories of services such as FAX sending, copy, and printing, and is stored in the hard disk 137.

Figure 3:
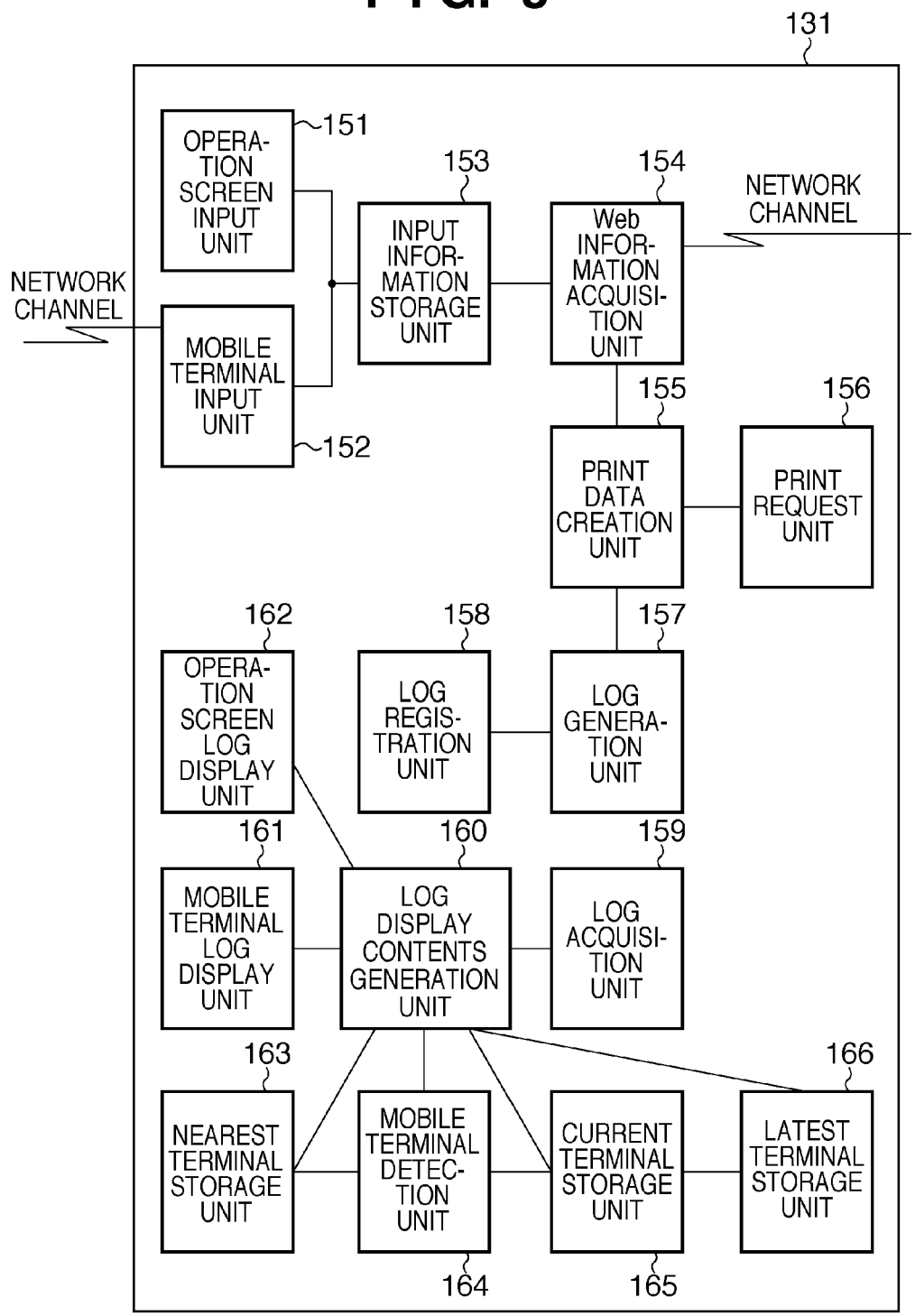
FIG. 3 is a block diagram showing the software configuration of the MFP according to the embodiment.

FIG. 3 is a block diagram showing the configuration of software that causes the MFP 100 to acquire and print Web content in cooperation with the mobile terminal 101 and store and browse the log information. The software is stored in the ROM 131.

An operation screen input unit 151 has a function of controlling input of the operation unit 133. This function allows the user to input, for example, the URL of Web content to be printed. A mobile terminal input unit 152 executes a function of receiving input by communication with the mobile terminal 101, thereby acquiring, for example, the URL of a Web content the user of the mobile terminal 101 wants to print. An input information storage unit 153 executes a function of storing the URL input from the operation screen input unit 151 or the mobile terminal input unit 152. The input information storage unit 153 also stores, as other storage contents, input information for discriminating the input source of information (mobile terminal/MFP registration/manual input), and when information is input from the mobile terminal 101, an ID (terminal ID) for specifying the mobile terminal. Note that the terminal ID will be described later with reference to the log information 144 shown in FIG. 7.

A Web information acquisition unit 154 executes a function of downloading, from the Web server 102, the information of the URL stored in the input information storage unit 153 and storing the information. A print data creation unit 155 executes a function of converting the information downloaded by the Web information acquisition unit 154 into print data printable using the formatter unit 139. A print request unit 156 executes a function of causing the printer unit 135 to print the print data created by the print data creation unit 155.

A log generation unit 157 executes a function of creating the log information 144 by putting result information representing the success/failure of printing executed by the print request unit 156 and the information of URLs and the like stored in the input information storage unit 153 together. A log registration unit 158 executes a function of storing the log information 144 created by the log generation unit 157 in the hard disk 137 or the like. A log acquisition unit 159 executes a function of acquiring the log information 144 registered by the log registration unit 158. A log display contents generation unit 160 executes a function of processing the log information 144 acquired by the log acquisition unit 159 so as to display it as, for example, the screen 502 or 503 on the MFP 100 or as, for example, the screen 504 on the mobile terminal 101. A mobile terminal log display unit 161 executes a function of displaying the information processed by the log display contents generation unit 160 on the mobile terminal 101 as, for example, the screen 504. An operation screen log display unit 162 executes a function of displaying the information processed by the log display contents generation unit 160 on the MFP 100 as, for example, the screen 502 or 503. A nearest terminal storage unit 163 executes a function of storing a terminal ID as identification information unique to a mobile terminal located at the shortest distance from the MFP 100. A mobile terminal detection unit 164 executes a function of detecting a mobile terminal capable of communicating with the MFP 100 and acquiring its terminal ID. A current terminal storage unit 165 executes a function of storing the terminal ID of a mobile terminal that is currently communicating with the MFP 100. A latest terminal storage unit 166 executes a function of storing the ID of a mobile terminal that has performed latest printing out of terminal IDs stored in the current terminal storage unit 165.

Figure 4:
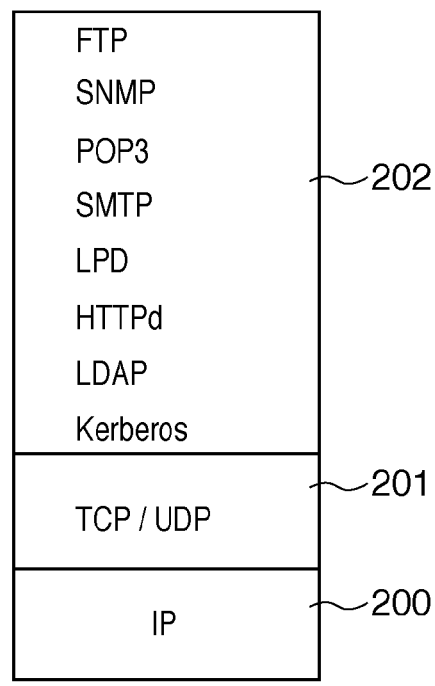
FIG. 4 is a view showing the structure of a network program installed in the MFP.

FIG. 4 is a view for explaining the structure of a network program installed in the MFP 100 according to the embodiment. This program is roughly divided into three layers: an IP layer 200, TCP/UDP layer 201, and application layer 202. The IP layer 200 is an Internet protocol layer that provides a service to send a message from a source host to a destination host in cooperation with relay nodes such as a router. The IP layer 200 executes a routing function of managing the address of a source host that sends data and the address of a destination host that receives the data and managing which path should be used to send the data to the destination host within the network in accordance with the address information. The TCP/UDP layer 201 is a transport layer that provides a service to send a message from a sending application process to a receiving application process. The TCP is a connection-oriented service that guarantees a high communication reliability. The UDP is a connectionless-oriented service that does not guarantee the communication reliability. The application layer 202 has a plurality of protocols, as will be described below.

FTP (File Transfer Protocol) of a file transfer service
SNMP as a network management protocol
LPD as a print server protocol
HTTPd as a WWW (World Wide Web) server protocol
SMTP (Simple Mail Transfer Protocol) as an e-mail sending/receiving protocol
POP3 (Post Office Protocol-Version 3) as a mail download protocol
LDAP (Lightweight Directory Access Protocol) to be used to manage user's e-mail address and the like and access a directory database
Note that a Kerberos authentication program defined by RFC1510 is also provided.

Figure 5:
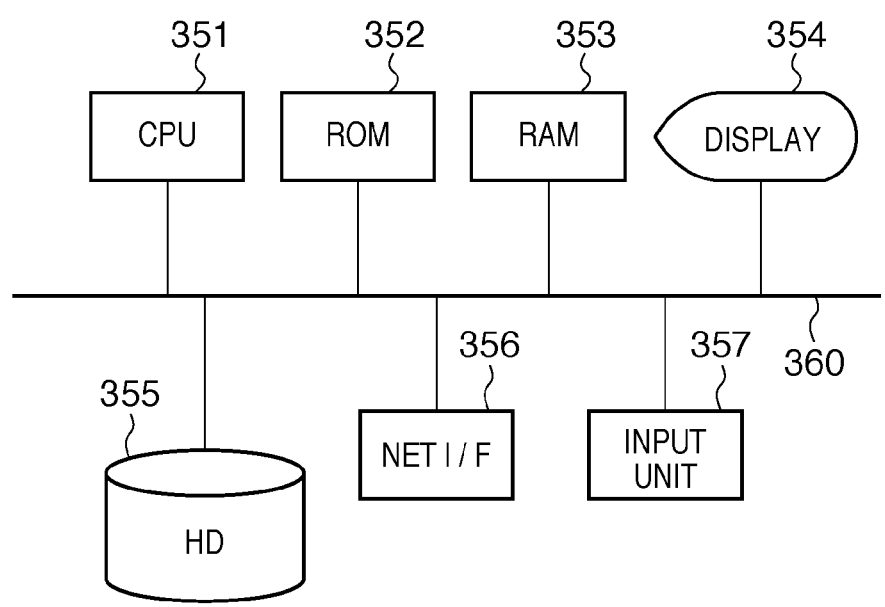
FIG. 5 is a block diagram showing the schematic arrangement of a Web server according to the embodiment.

FIG. 5 is a block diagram showing the schematic arrangement of the Web server 102 according to the embodiment. A CPU 351 implements various kinds of control by executing programs loaded from a ROM 352 to a RAM 353. The ROM 352 stores, for example, a boot program that starts up to activate the server and various parameters of the server. The RAM 353 functions as a main memory. A display 354 performs various kinds of display under the control of the CPU 351. A hard disk (HD) 355 serving as a secondary storage device stores job log information collected from the MFP 100. A network interface 356 controls data sending/reception to/from a network. An input unit 357 includes, for example, a keyboard and a pointing device. A system bus 360 connects the above-described units to the CPU 351.

Figure 6:
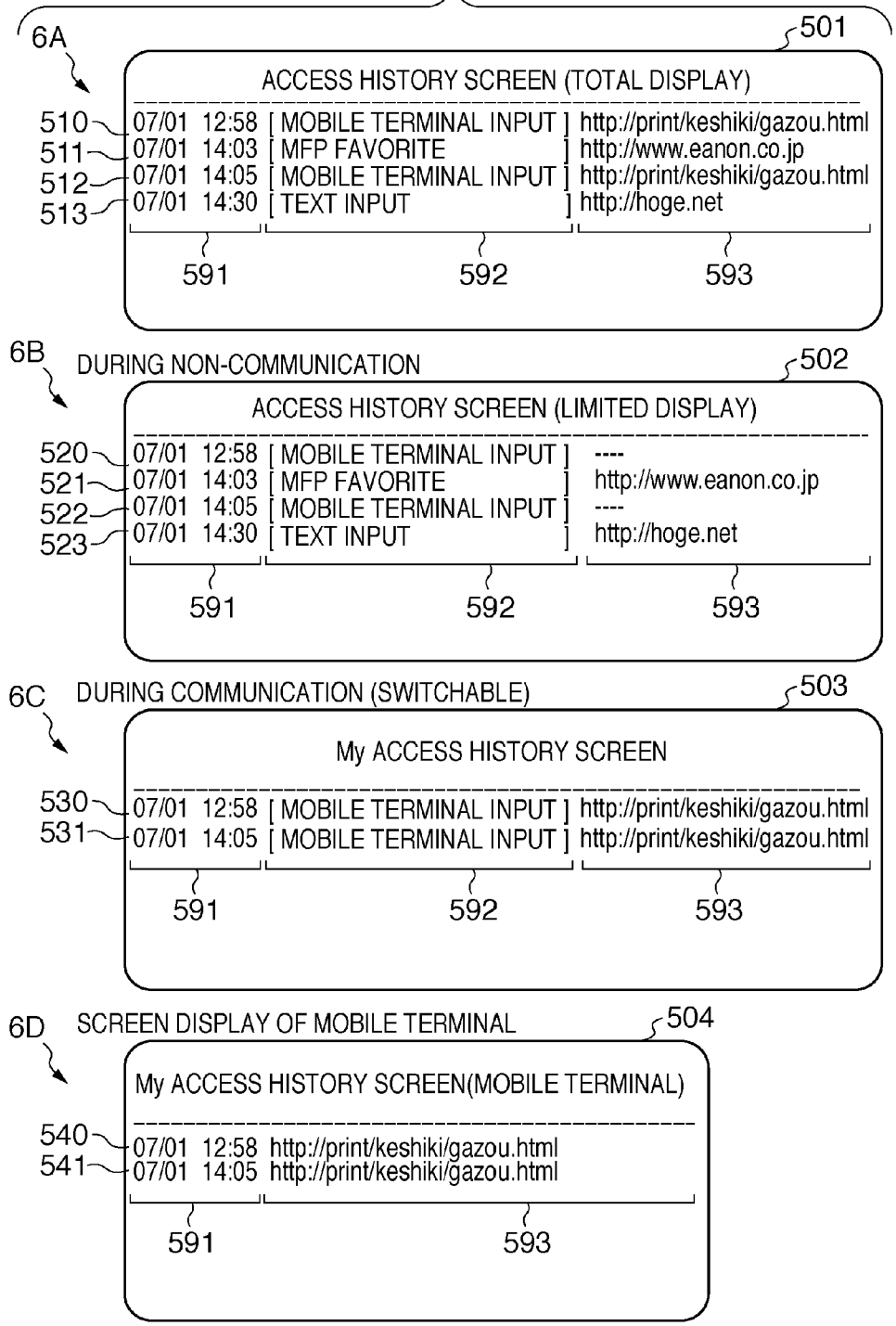
FIG. 6 shows views for explaining history screens displayed on the MFP and a mobile terminal.

FIG. 6 is a view for explaining history screens displayed on the MFP 100 and the mobile terminal 101 according to the embodiment. Referring to FIG. 6, 6A is a view for explaining a prior art, and 6B to 6C illustrate examples of screens of the embodiment corresponding to the screen examples 502 to 504 in FIG. 1.

In FIG. 6, an item 591 indicates the date/time of access. An item 592 indicates the source from which the access request has come. The item 592 shows, for example, "mobile terminal input" for an input from a mobile terminal. Based on the contents registered in the favorite of the MFP, the operation screen input unit 151 selects, in accordance with an operation on the operation unit 133, a URL registered in advance, thereby inputting the URL. In this case, the item 592 shows "MFP favorite". "Text input" represents that the user has directly input a URL using the soft keys of the operation unit 133 and the like. An item 593 indicates information such as a URL that is an information acquisition source input by the operation screen input unit 151 or the mobile terminal input unit 152. Access histories 510 to 513 are histories of access displayed in chronological order.

A screen 501 indicated by 6A of FIG. 6 is an example of a screen displayed conventionally. The screen 501 displays all items of the access histories 510 to 513. Note that "access history" is an expression that substitutes for the contents of each history of the log information 144.

The screen 502 indicated by 6B of FIG. 6 is an example of a screen displayed on the operation unit 133 of the MFP 100 according to the embodiment. Access histories 520 to 523 correspond to the access histories 510 to 513 of 6A. In this case, since the items 592 of the access histories 520 and 522 are "mobile terminal input", the items 593 (information acquisition sources) are masked.

The screen 503 indicated by 6C of FIG. 6 is an example of a My access history screen displayed on the operation unit 133 of the MFP 100 during communication with the mobile terminal 101. The screen displays only access histories requested by the mobile terminal 101. Access histories 530 and 531 are histories of access for printing displayed in chronological order.

The screen 504 indicated by 6D of FIG. 6 is an example of a My access history screen displayed on the mobile terminal 101 that is communicating with the MFP 100. The screen displays only access histories requested by the mobile terminal 101. Access histories 540 and 541 are histories of access for printing displayed in chronological order.

FIG. 7 is a view showing an example of the log information 144 generated by the log generation unit 157 of the MFP 100. An item 620 indicates a management number for specifying an access history. An item 621 indicates a date/time the access (printing) has occurred. An item 622 indicates whether printing has executed normally (OK) or terminated abnormally (NG). An item 623 indicates from where URL information representing the location of information to be printed (to be described later as an item 624) has been input. "K" represents input from a mobile terminal; "F", input from the favorite registered in the MFP 100; and "T", input from the input field of the MFP 100. The item 624 indicates URL information representing the location of information to be printed. The Web server 102 can acquire the information to be printed based on the URL information. The URL information concerns personal information because it enables to identify print contents. For input from a mobile terminal, an item 625 indicates an ID to specify the mobile terminal. Access histories 610 to 613 are histories of access (log information) to the MFP 100 arranged in the order of occurrence (in chronological order).

In FIGS. 8 and 9, 8A to 8C and 9A to 9C are views showing examples of UI screens displayed on the operation unit 133 of the MFP 100. In FIG. 8, 8A shows a setting screen concerning mobile terminal log registration. This screen is displayed to set whether or not to register access from the mobile terminal 101 as an access history when printing information of a URL input from the mobile terminal 101. If the user selects the ON button, the log information 144 records the access history of the mobile terminal. If the user selects the OFF button, the log information 144 does not record the access history of the mobile terminal.

In FIG. 8, 8B shows a setting screen concerning mobile terminal URI (URL) display. This screen is displayed to set whether or not to display URL information input from the mobile terminal 101. If the user selects the ON button, the access history is directly displayed. If the user selects the OFF button, URLs in the access history of the mobile terminal are masked in the display (the URLs are not displayed) (6B of FIG. 6).

In FIG. 8, 8C shows a setting screen concerning My access history switching display. This screen is displayed to set whether to display only information of the user of the mobile terminal 101 or a screen that shows information of all users when the mobile terminal 101 is communicating with the MFP 100. If the user selects the ON button, the My access history screen of only the mobile terminal under communication is displayed (6C of FIG. 6). If the user selects the OFF button, the access history screen of 6A in FIG. 6 (total display) or the access history screen of 6B (limited display) is displayed.

Figure 9:
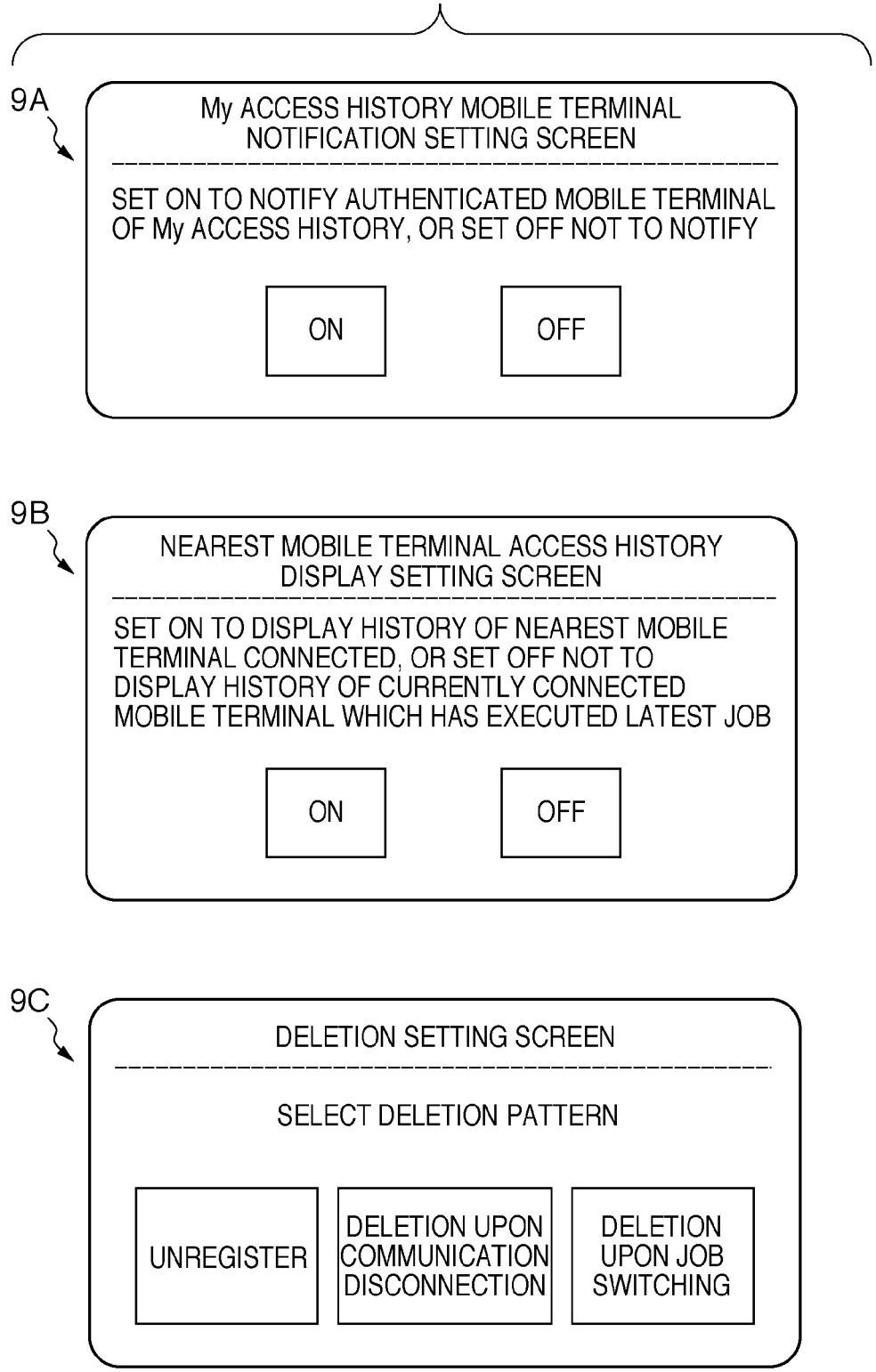
FIG. 9 shows views of examples of UI screens to be used to set display of the access history of the mobile terminal and the log information deletion timing.

In FIG. 9, 9A shows a screen configured to set whether or not to notify the mobile terminal of the My access history. The screen is displayed to set whether the MFP 100 causes the mobile terminal log display unit 161 to notify the mobile terminal 101 of the access history of log information. If the user selects the ON button, setting is done to notify the mobile terminal 101 of, for example, the log information shown in 6D of FIG. 6. If the user selects the OFF button, setting is done not to notify the mobile terminal 101 of the log information.

In FIG. 9, 9B shows a screen configured to set whether or not to display the access history of the nearest mobile terminal. The screen is displayed to set whether the MFP 100 displays, on the operation unit 133, the access history of the mobile terminal 101 located at the shortest distance from the MFP 100. If the user selects the ON button, the access history of the mobile terminal located at the shortest distance from the MFP 100 is displayed on the operation unit 133 of the MFP 100, like, for example, the screen 503. If the user selects the OFF button, the access history of a mobile terminal that has executed the latest job out of mobile terminals stored in the current terminal storage unit 165 is displayed on the operation unit 133 of the MFP 100, like, for example, the screen 503.

In FIG. 9, 9C shows a deletion setting screen configured to set the condition to delete an access history from the log information 144 when the OFF button is selected on the mobile terminal log registration screen shown in 8A of FIG. 8. The screen is displayed to select the condition to delete an access history although it is not registered as log information. If the user selects the "unregister" button, no access history is registered in the log information 144. If the user selects the "deletion upon communication disconnection" button, the log information 144 includes only the access history of the mobile terminal that is communicating with the MFP 100. When the communication between the MFP 100 and the mobile terminal is not detected anymore, the access history of the mobile terminal is deleted from the log information 144. If the user selects the "deletion upon job switching" button, an access history representing communication with a mobile terminal is deleted when new access is confirmed in the log information 144 or when log information is added.

Figure 10:
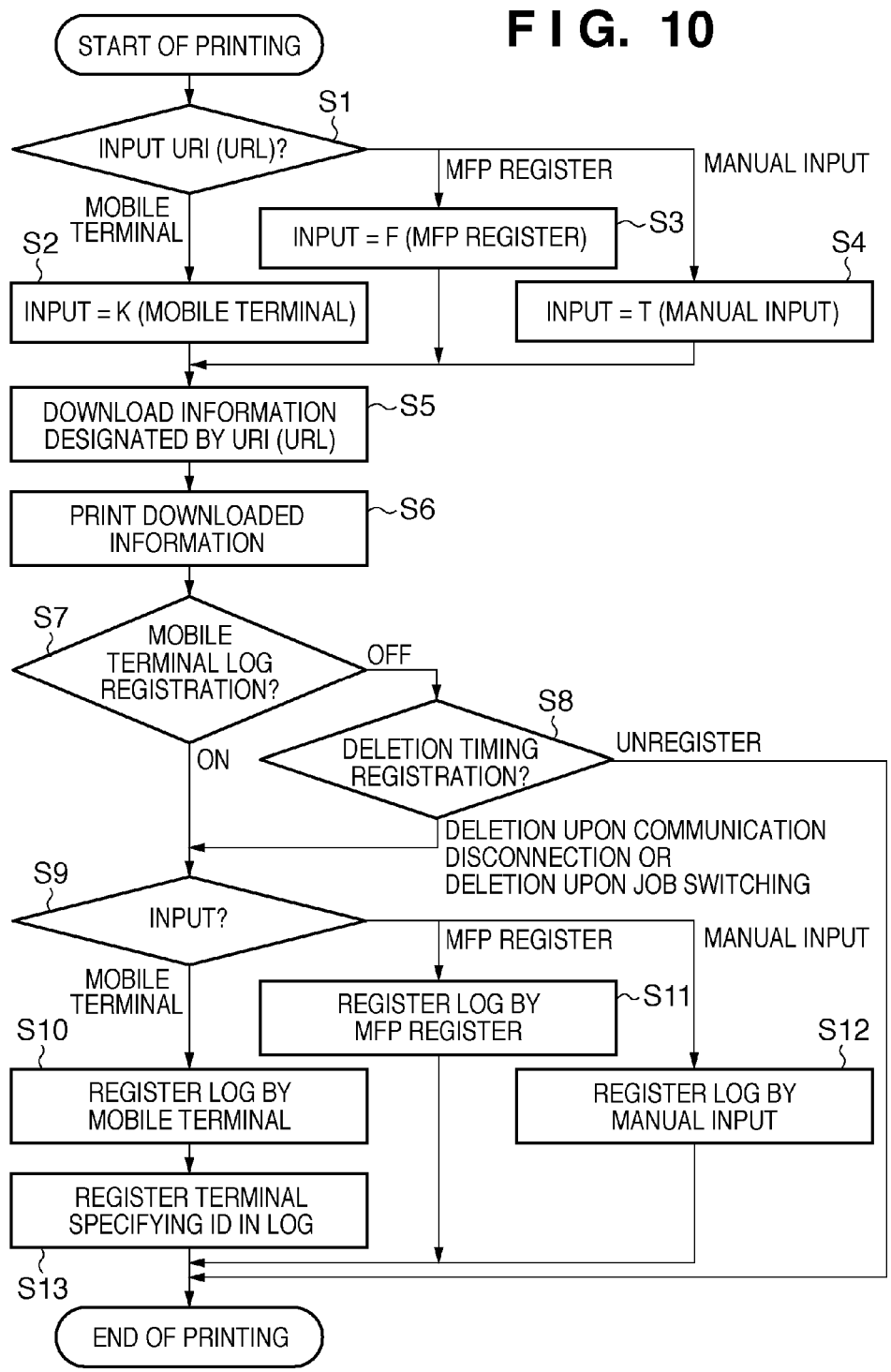
FIG. 10 is a flowchart for explaining processing of registering log information in the MFP.

FIG. 10 is a flowchart for explaining processing of registering log information in the MFP 100 according to the embodiment. Note that this processing is achieved by causing the CPU 130 to execute a program stored in the ROM 131.

In step S1, the CPU 130 determines, based on information of the input information storage unit 153, from where the URI (URL) is input. If the CPU 130 determines in step S1 that the URL is input from the mobile terminal 101, the process advances to step S2 to set "K" (mobile terminal) in the item 623, as shown in FIG. 7, and the process then advances to step S5. Upon determining in step S1 that the URL is input from the favorite of the MFP 100, the process advances to step S3 to set "F" (MFP register) in the item 623, and the process then advances to step S5. Upon determining in step S1 that the URL is manually input on the MFP 100, the process advances to step S4 to set "T" (manual input) in the item 623, and the process then advances to step S5. In step S5, using the URL input from the input information storage unit 153, the Web information acquisition unit 154 downloads information to be printed from the Web server 102, and the process advances to step S6. In step S6, the print data creation unit 155 creates print data based on the information downloaded in step S5. The print request unit 156 requests the printer unit 135 to print, and the process advances to step S7.

In step S7, the CPU 130 determines whether the ON button is selected on the mobile terminal log registration screen in 8A of FIG. 8. If the ON button is selected, the process advances to step S9. If the OFF button is selected, the process advances to step S8. In step S8, the CPU 130 determines whether "unregister" is selected on the deletion setting screen in 9C of FIG. 9. If YES in step S8, the processing ends. If "deletion upon communication disconnection" or "deletion upon job switching" is selected in step S8, the process advances to step S9.

In step S9, the CPU 130 determines from where the input has come, as in step S1. If the input is "K" (mobile terminal), the process advances to step S10 to cause the log generation unit 157 to generate log information while setting "K" (mobile terminal) in the input. The process advances to step S13 to cause the log generation unit 157 to generate a terminal ID that specifies the mobile terminal and cause the log registration unit 158 to register the terminal ID. The processing thus ends. If the CPU 130 determines in step S9 that the input is "F" (MFP register), the process advances to step S11 to cause the log generation unit 157 to generate log information while setting the "MFP 100" in the input. Then, the log registration unit 158 registers the log information. If the CPU 130 determines in step S9 that the input is "T" (manual input), the process advances to step S12 to cause the log generation unit 157 to generate log information while setting "manual input". Then, the log registration unit 158 registers the log information, and the processing ends.

In this way, log information about access (printing) via the MFP 100 is registered in the hard disk 137 as the log information 144, as shown in, for example, FIG. 7.

Figure 11:
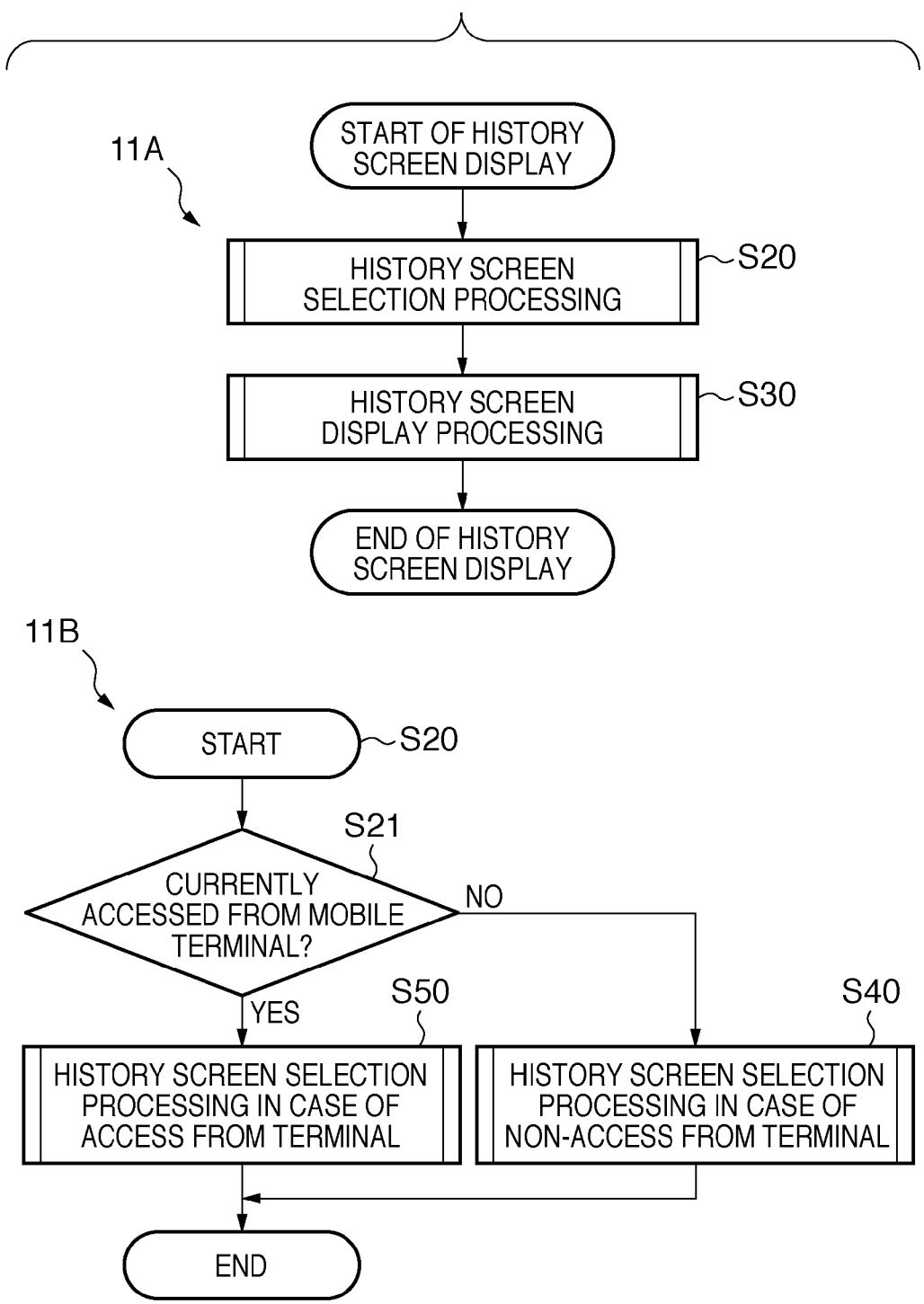
FIG. 11 shows flowcharts for explaining MFP processing of displaying the access history screen in FIG. 6.

In FIG. 11, 11A is a flowchart for explaining processing of causing the MFP 100 to display, on the access history screen shown in FIG. 6, an access history for a print request input by a user operation on the MFP 100. Note that this processing is executed by the CPU 130 based on a program stored in the ROM 131.

In step S20, the CPU 130 executes history screen selection processing to acquire a history screen to be displayed on the MFP 100 and a history screen to be displayed on the mobile terminal 101. The process advances to step S30. In step S30, the CPU 130 executes history screen display processing to edit the display contents of the history screen to be displayed on the MFP 100 and the history screen to be displayed on the mobile terminal 101, thus ending the processing.

In FIG. 11, 11B is a flowchart illustrating the process in step S20 of 11A. In step S21, the CPU 130 causes the mobile terminal detection unit 164 to detect whether the MFP 100 is being accessed from mobile terminals (assumed to be plural), and determines whether mobile terminals stored in the current terminal storage unit 165 exist. If mobile terminals accessing the MFP exist in step S21, the process advances to step S50. In step S50, the CPU 130 executes history screen selection processing in case of access from a mobile terminal, and ends the processing. On the other hand, if there are no mobile terminals accessing the MFP in step S21, the process advances to step S40. In step S40, the CPU 130 executes history screen selection processing in case of non-access from a mobile terminal, and ends the processing.

Figure 12:
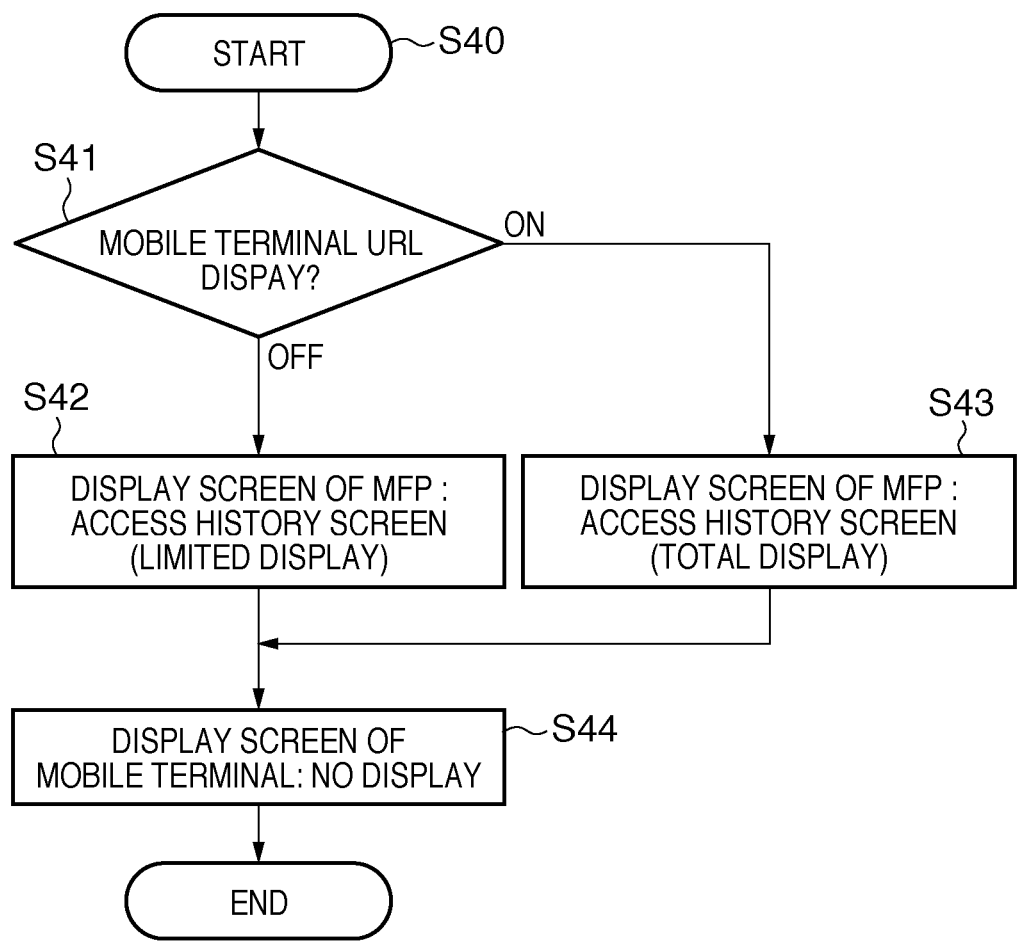
FIG. 12 is a flowchart illustrating that the display contents of the access history screen are greatly affected by whether communication with the mobile terminal is progressing.

FIG. 12 is a flowchart illustrating the process in step S40 of 11B. In step S41, the CPU 130 determines the set value for display of a URL from the mobile terminal (8B of FIG. 8). Upon determining that the OFF button is selected, the process advances to step S42 to determine the display screen setting of the MFP 100 as the display style of the access history screen (limited display) 502 (6B of FIG. 6), and the process then advances to step S44. On the other hand, if the CPU 130 determines in step S41 that the ON button is selected, the display screen setting of the MFP 100 is determined as the access history screen (total display) 501 (6A of FIG. 6), and the process then advances to step S44. In step S44, the CPU 130 prohibits display on the display unit of the mobile terminal.

With this processing, if setting is done on the UI screen in 8B of FIG. 8 not to display the URL input from the mobile terminal, the MFP 100 can be controlled to mask the URL in the access history of the mobile terminal, as shown in 6B of FIG. 6.

Figure 13:
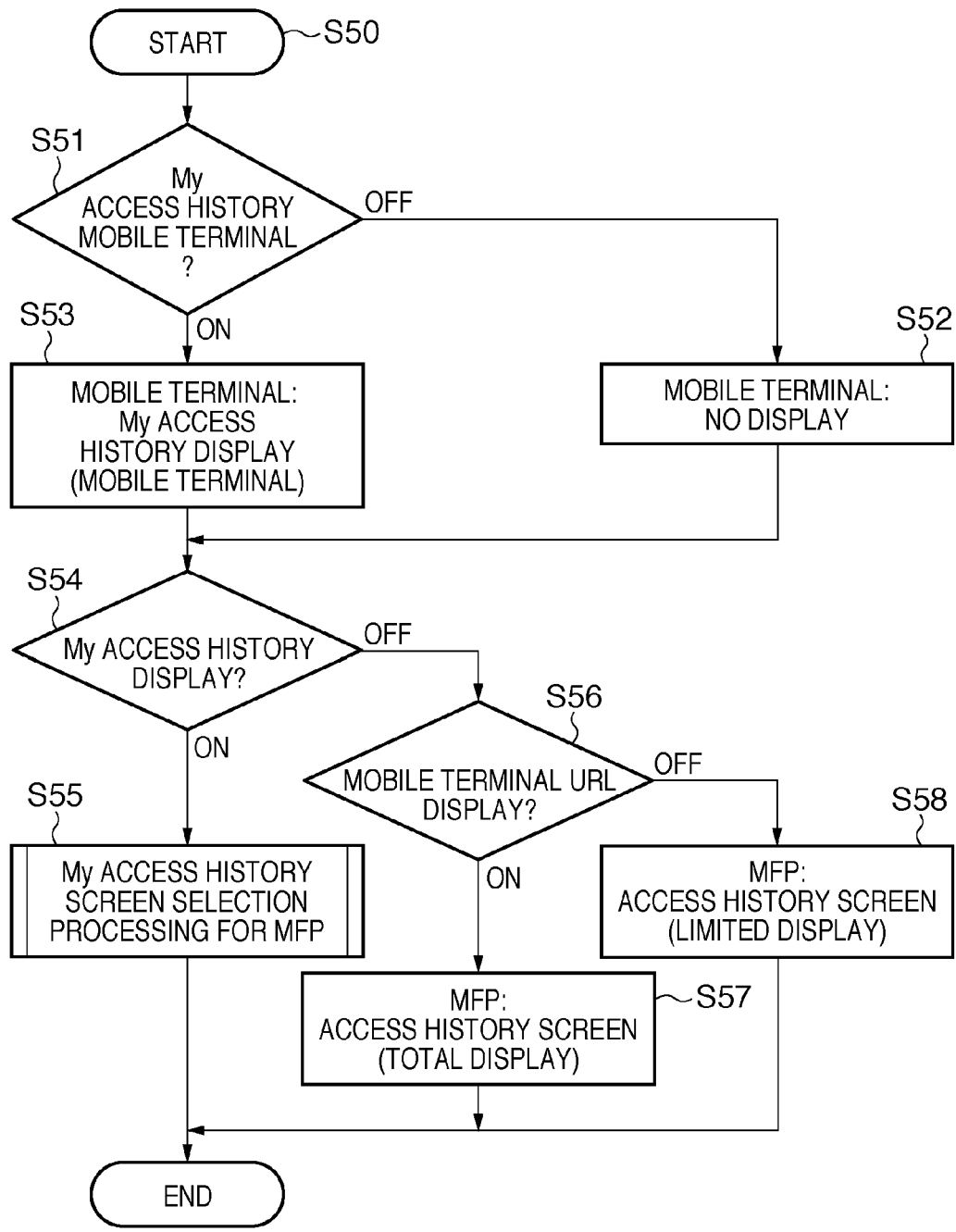
FIG. 13 is a flowchart for explaining the process in step S50 of FIG. 11.

FIG. 13 is a flowchart for explaining the process in step S50 of 11B in FIG. 11 (during access from the mobile terminal). In step S51, the CPU 130 determines the set value representing whether to notify the mobile terminal of the My access history (8A of FIG. 8). Upon determining that the ON button is selected, the process advances to step S53 to determine the My access history screen (mobile terminal) (for example, 6D of FIG. 6) to be displayed on the mobile terminal 101 during communication, and the process then advances to step S54. On the other hand, if the CPU 130 determines in step S51 that the OFF button is selected, the process advances to step S52 to determine that the setting is done not to display the My access history screen on the mobile terminal 101, and the process then advances to step S54. In step S54, the CPU 130 determines whether the My access history display setting (8C of FIG. 8) is ON (display). Upon determining that the setting is ON, the process advances to step S55. The CPU 130 executes My access history screen selection processing for the MFP 100, and ends the processing.

On the other hand, upon determining in step S54 that the My access history display setting is OFF, the process advances to step S56. In step S56, the CPU 130 determines the set contents of mobile terminal URL display (8B of FIG. 8). Upon determining that the setting is done to display the URL from the mobile terminal, the process advances to step S57. In step S57, the CPU 130 sets the display screen of the MFP 100 to the access history screen (total display: 6A of FIG. 6), and ends the processing. Upon determining in step S56 that the setting is done not to display the URL from the mobile terminal, the process advances to step S58. In step S58, the CPU 130 sets the display screen of the MFP 100 to the access history screen (limited display: 6B of FIG. 6), and ends the processing.

With this processing, the display unit of the mobile terminal that is communicating with the MFP can display the access history as shown in, for example, 6D of FIG. 6 in accordance with the UI screens settings in FIG. 8. In addition, whether or not to display, on the operation unit 133 of the MFP 100, the URL from the mobile terminal that is communicating with the MFP is switched so as to display the screen as in, for example, 6A or 6B of FIG. 6.

Figure 14:
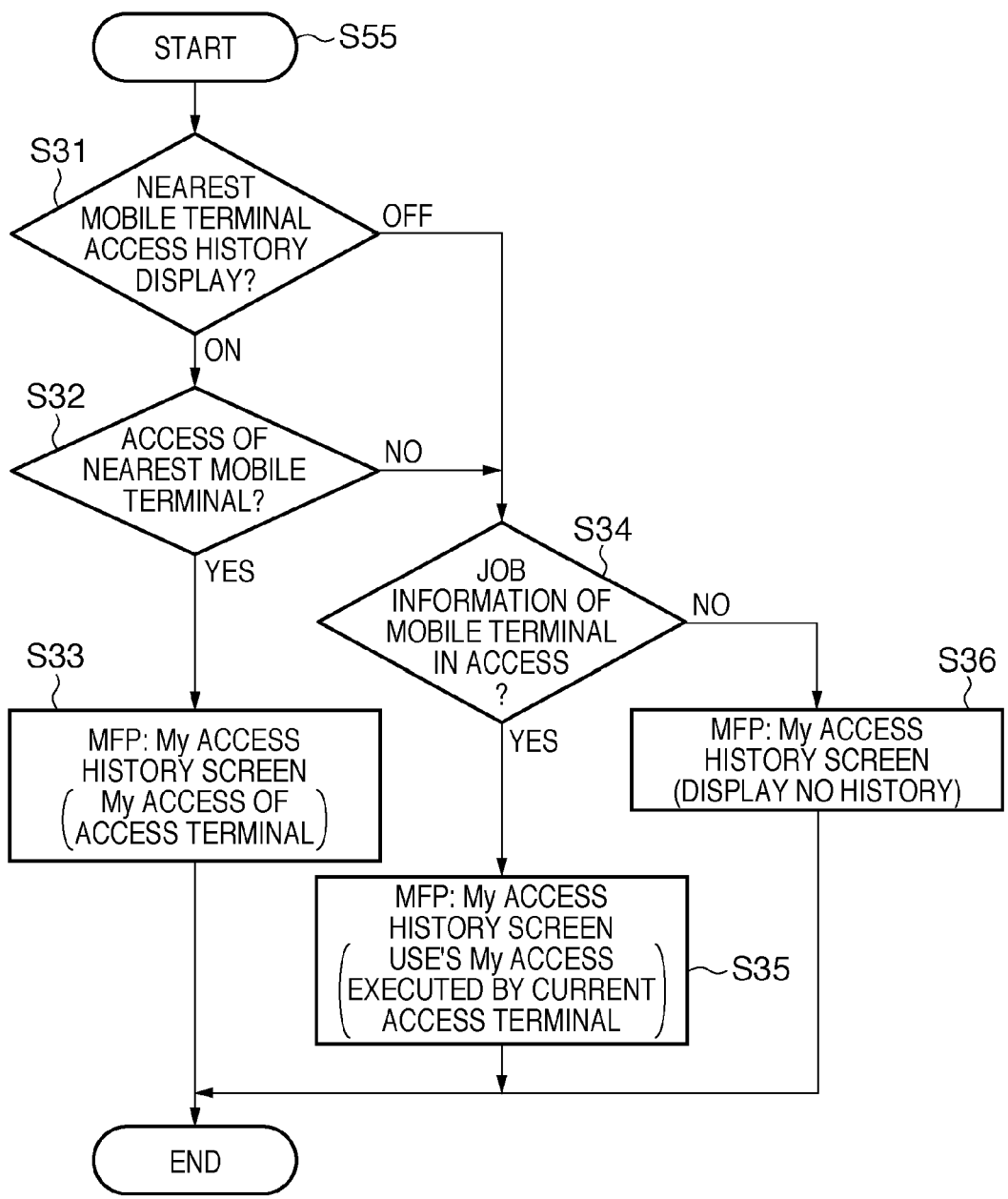
FIG. 14 is a flowchart for explaining the process in step S55 of FIG. 13.

FIG. 14 is a flowchart for explaining the process in step S55 of FIG. 13. In step S31, the CPU 130 determines the set value of nearest mobile terminal access history display (9B of FIG. 9). If the CPU 130 determines in step S31 that the set value of nearest mobile terminal access history display is ON, the process advances to step S32 to determine whether the mobile terminal accessing the MFP is a mobile terminal that is registered in the nearest terminal storage unit 163 and that is located closest to the MFP 100. If the CPU 130 determines in step S31 that the set value of nearest mobile terminal access history display is OFF, the process advances to step S34. Upon determining in step S32 that the mobile terminal is closest to the MFP 100, the process advances to step S33. In step S33, the CPU 130 determines to set the display screen of the MFP 100 to the My access history screen (6C of FIG. 6) so as to display the access history of the mobile terminal that is requesting access history screen display, and ends the processing. This allows to display the access history of the mobile terminal at the shortest distance if ON is set in 9B of FIG. 9.

On the other hand, if the CPU 130 determines in step S32 that the mobile terminal is not closest to the MFP 100, the process advances to step S34 to determine whether the log information 144 includes the access history of the mobile terminal in access. Upon determining that log information includes the access history of the mobile terminal in access, the process advances to step S35. In step S35, the CPU 130 determines to set the display screen of the MFP 100 to the My access history screen (6C of FIG. 6) that shows the access history of a mobile terminal which has executed the latest access out of mobile terminals accessing the MFP 100, and ends the processing. If the CPU 130 determines in step S34 that log information does not include the access history of the mobile terminal in access, the process advances to step S36 to determine to set the display screen to the My access history screen that displays no access history at all, and the processing ends. This allows the MFP 100 to display the access history of the mobile terminal in communication on the operation unit and thus display the latest access history.

Figure 15:
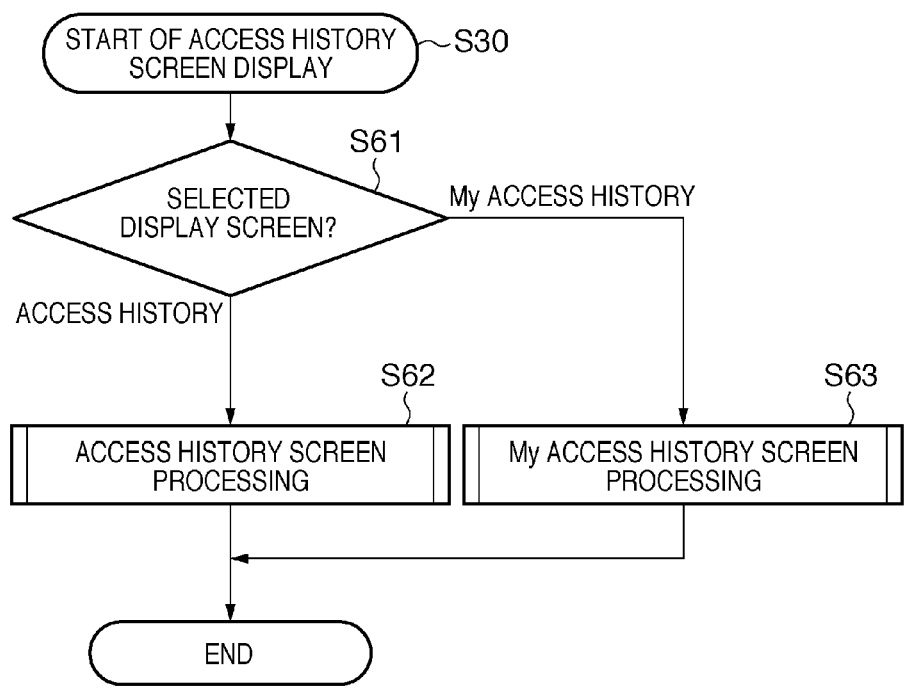
FIG. 15 is a flowchart for explaining the process in step S30 of FIG. 11.

FIG. 15 is a flowchart for explaining the process in step S30 of FIG. 11. In step S61, the CPU 130 determines which is selected as the style of the display screen by the history screen selection processing in step S20 of FIG. 11, the access history screen or the My access history screen. Upon determining that the access history screen is selected, the process advances to step S62 to execute access history screen processing, and the processing ends. On the other hand, upon determining in step S61 that the My access history screen is selected, the process advances to step S63 to execute My access history screen processing, and the processing ends.

Figure 16:
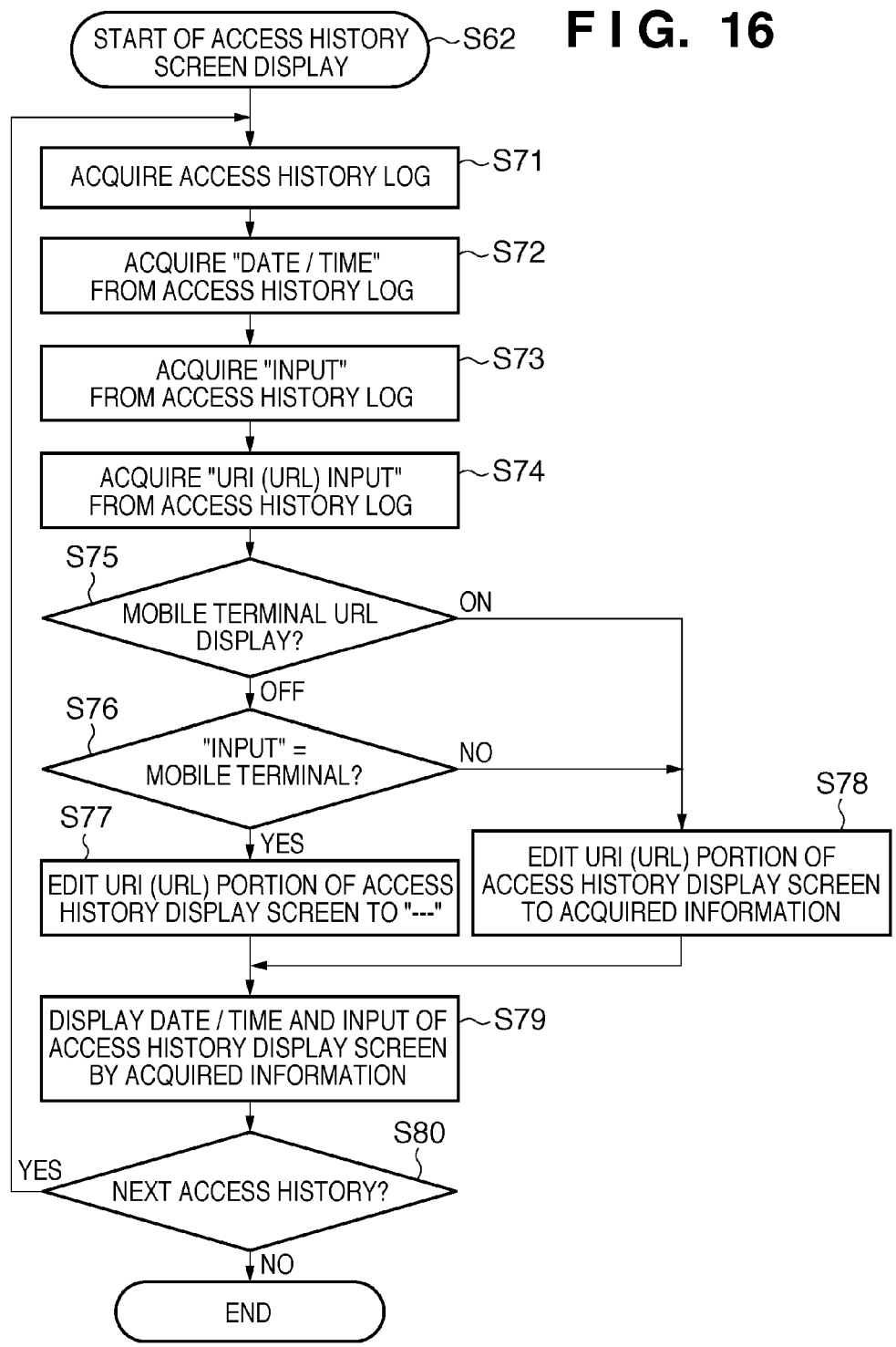
FIG. 16 is a flowchart illustrating the process in step S62 of FIG. 15.

FIG. 16 is a flowchart illustrating processing of displaying the access history screen (total display) or access history screen (limited display) in step S62 of FIG. 15. In step S71, the CPU 130 extracts an access history from the log information 144 registered in the hard disk 137. The process advances to step S72, and the CPU 130 extracts "date/time" information (item 621 in FIG. 7) from the access history. The process advances to step S73, and the CPU 130 acquires "input" information (item 623 in FIG. 7) from the access history. The process advances to step S74, and the CPU 130 acquires "URI (URL)" information (item 624 in FIG. 7) from the access history. The process advances to step S75, and the CPU 130 determines whether setting is done on the UI screen in 8B of FIG. 8 to display the URL on the mobile terminal. If the set contents represent OFF (no display), the process advances to step S76. If ON (display), the process advances to step S78. In step S76, the CPU 130 determines whether "input" acquired in step S73 is "K" (mobile terminal). If "input" is "mobile terminal", the process advances to step S77 to mask ("- - -") the "URI (URL)" information acquired in step S74. The process then advances to step S79. If "input" is not "K" (mobile terminal) in step S76, the process advances to step S78. In step S78, the "URI (URL)" information acquired in step S74 is not directly processed. The process then advances to step S79. In step S79, the CPU 130 displays "date/time" and "input" on the access history display screen, and displays "URI (URL)" in accordance with the display information determined in step S77 or S78. In step S80, the CPU 130 determines whether the log information includes the next access history. Upon determining in step S80 that the next access history exists, the process returns to step S71 to acquire the next access history. Upon determining in step S80 that no next access history exists, the processing ends.

With this processing, it is possible to cause the MFP to determine, based on the setting of the UI screen in 8B of FIG. 8, whether or not to display the URL accessed from the mobile terminal, and display the access history, as shown in, for example, 6A and 6B of FIG. 6.

Figure 17A:
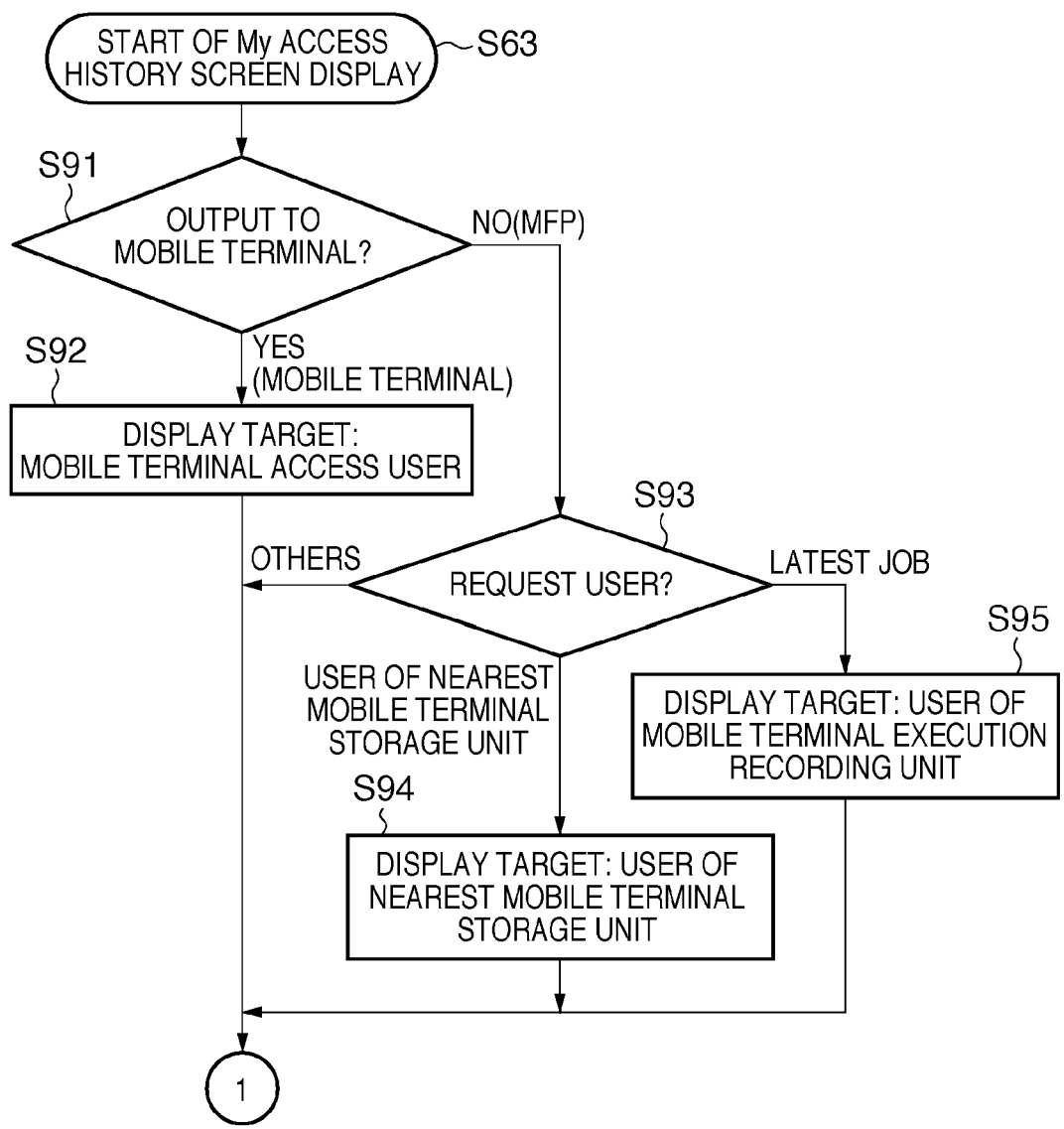
FIGS. 17A and 17B are flowcharts illustrating My access history screen display processing in step S63 of FIG. 15.
Figure 17B:
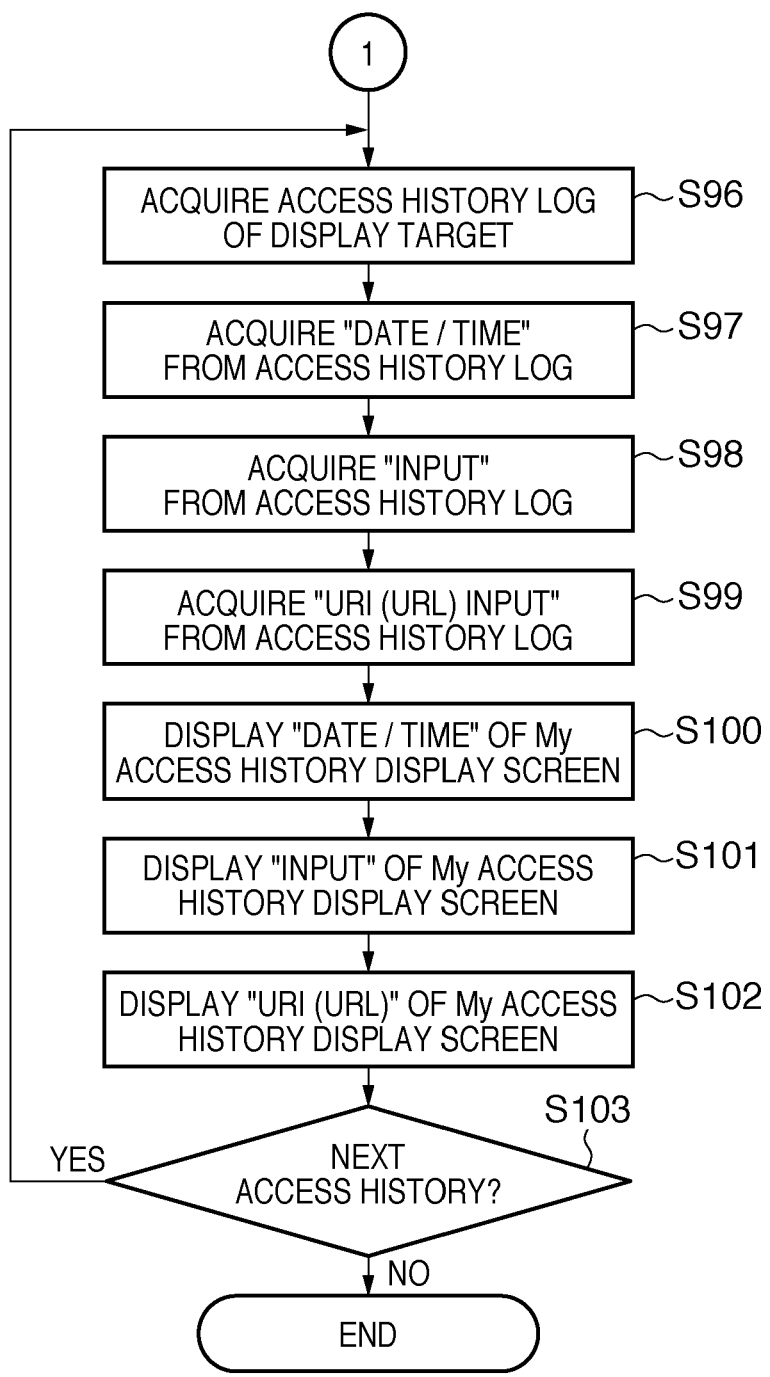

FIGS. 17A and 17B are flowcharts illustrating processing of displaying the My access history screen display or the My access history screen (mobile terminal) in step S63 of FIG. 15. In step S91, the CPU 130 determines whether or not a request is to display the My access history screen (mobile terminal) (6D of FIG. 6). Upon determining that a request is to display the My access history screen on the mobile terminal, the process advances to step S92. In step S92, the CPU 130 determines the access history of the mobile terminal 101 in access as the display target. On the other hand, upon determining in step S91 that a request is not to display the My access history screen on the mobile terminal, the process advances to step S93. In step S93, the CPU 130 determines the type of mobile terminal in access. Upon determining in step S93 that the mobile terminal in access is a mobile terminal stored in the nearest terminal storage unit 163, the process advances to step S94 to determine the access history of the mobile terminal stored in the nearest terminal storage unit 163 as the display target. The process then advances to step S96. Upon determining in step S93 that the mobile terminal in access is a mobile terminal stored in the latest terminal storage unit 166 as a mobile terminal that has executed the latest job, the process advances to step S95. In step S95, the CPU 130 determines the access history of the mobile terminal stored in the latest terminal storage unit 166 as the display target. The process then advances to step S96. On the other hand, if the mobile terminal is of another user in step S93, the CPU 130 determines that no display target exists, and the process advances to step S96.

If any mobile terminal is determined as the display target in step S92, S94, or S95, the CPU 130 acquires the access history of the mobile terminal for the log information in step S96. The process advances to step S97, and the CPU 130 acquires "date/time" information from the access history acquired in step S96. The process advances to step S98, and the CPU 130 acquires "input" information from the access history. The process advances to step S99, and the CPU 130 acquires "URI (URL)" information from the access history. In steps S100 to S102, the CPU 130 displays the "date/time", "input", and "URI (URL)" information on the access history display screen. The process advances to step S103, and the CPU 130 determines whether the log information includes the next access history. Upon determining that the next access history exists, the process returns to step S96 to acquire the access history log of the mobile terminal determined as the display target. On the other hand, upon determining in step S103 that no next access history exists, the processing ends. If it is determined in step S93 that no display target exists, the processing may directly end.

With this processing, the MFP 100 can create the My access history display screen for the mobile terminal under communication and send it to the terminal. This allows the mobile terminal to display the access history of its own on its display unit, as shown in, for example, 6D of FIG. 6. In addition, a mobile terminal at the shortest distance from the MFP 100 or a mobile terminal that has issued the latest job to the MFP 100 can display the access history of its own on its display unit.

Figure 18B:
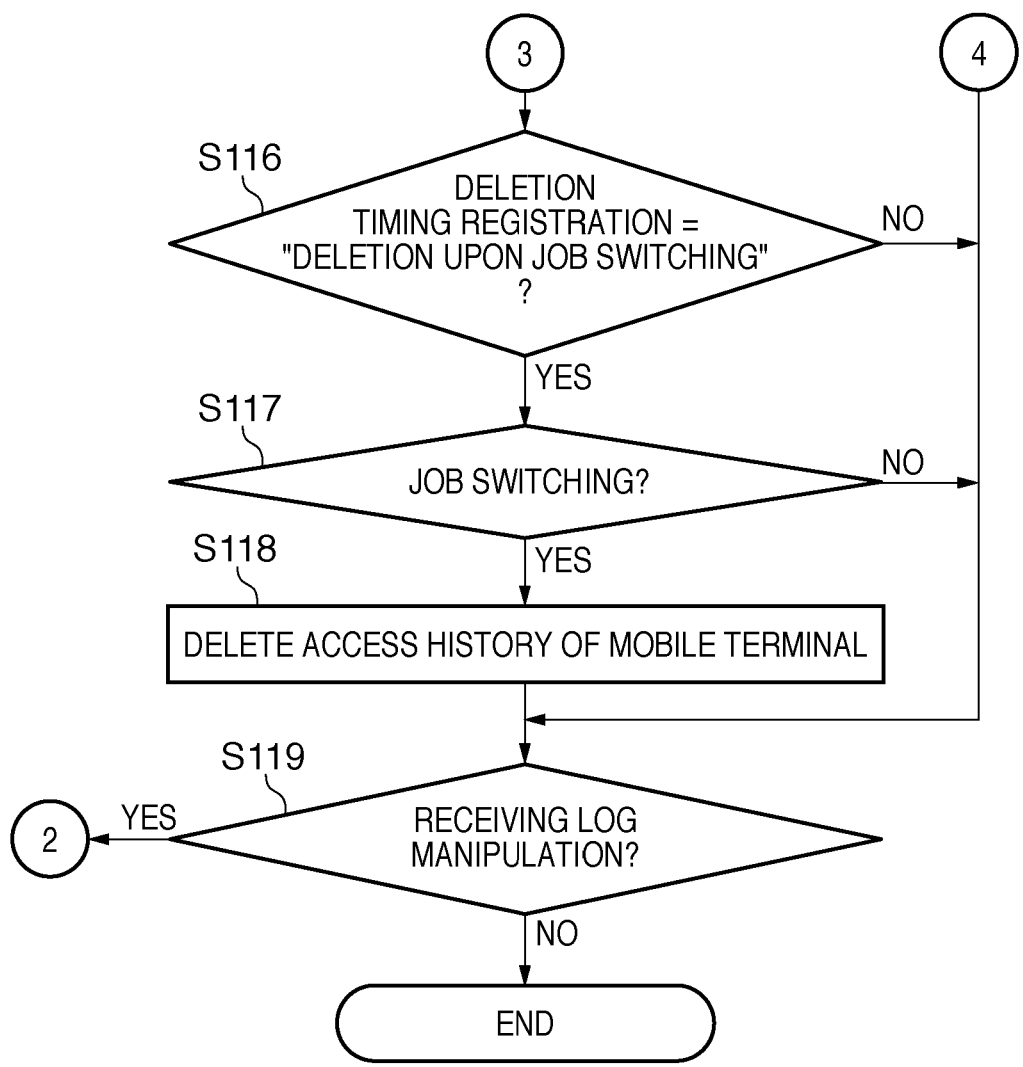

FIGS. 18A and 18B are flowcharts for explaining processing of deleting the access history from the log information in the MFP according to the embodiment. Note that this processing is achieved by causing the CPU 130 to execute a program stored in the ROM 131.

In step S111, the CPU 130 determines the log registration state of the mobile terminal shown in 8A of FIG. 8. If mobile terminal log registration is set to ON in step S111, the access history is excluded from the deletion target, and therefore, the process advances to step S119. If mobile terminal log registration is set to OFF (not registered) in step S111, the process advances to step S112. In step S112, the CPU 130 determines whether the deletion timing is set to "unregister" in 9C of FIG. 9. If the deletion setting is "unregister", the process advances to step S119. If the deletion setting is not "unregister" in step S112, the process advances to step S113. In step S113, the CPU 130 determines whether the deletion setting is "deletion upon communication disconnection". If NO in step S113, the process advances to step S116. If the deletion setting is "deletion upon communication disconnection" in step S113, the process advances to step S114. In step S114, the CPU 130 determines whether there is a mobile terminal whose communication is disconnected. If YES in step S114, the process advances to step S115 to delete the access history of the mobile terminal of the disconnected communication from the job information.

The process advances to step S116, and the CPU 130 determines whether the deletion setting is "deletion upon job switching". If YES in step S116, the process advances to step S117. If the deletion setting is not "deletion upon job switching" in step S116, the process advances to step S119. In step S117, the CPU 130 determines whether job switching is detected. If no job switching is detected, the process advances to step S119. Upon detecting job switching, the process advances to step S118 to delete all access histories of the mobile terminal. The process advances to step S119, and the CPU 130 determines whether log information can be recorded. Upon determining that the log is manipulatable, the process returns to step S111. On the other hand, if NO in step S119, the processing ends.

In this way, it is possible to automatically delete, in accordance with, for example, the contents set on the UI screen in 9C of FIG. 9, the log information of a mobile terminal whose access history is recorded. This makes it possible to automatically delete, from the log information of the MFP, the log information of a mobile terminal that should not remain when the communication between the mobile terminal and the MFP is disconnected, or when the job is switched.

Note that in this above-described embodiment, the URL of the access destination, which is part of information for specifying the job from the mobile terminal, is caused to be non-display. However, the present invention is not limited to this. For example, the telephone number, ID, or access date/time of the mobile terminal may be caused to be non-display.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298830, filed Dec. 28, 2009, which is hereby incorporated by reference herein in its entirety.

What is claimed is:

1. An image processing apparatus having a communication function with a mobile terminal, the image processing apparatus comprising:
   a storage unit configured to store histories of a plurality of print jobs executed by the image processing apparatus;
   a display unit configured to display the histories of the plurality of print jobs stored in the storage unit;
   a determination unit configured to determine whether each of the plurality of print jobs is a print job which is based on information input from the mobile terminal or a print job which is based on information input from an operation unit of the image processing apparatus; and
   a display control unit configured to:
   (i) when a history of a print job that is determined by the determination unit to be based on information input from the operation unit of the image processing apparatus is displayed on the display unit, control the display unit to display information indicating the image processing apparatus and information for specifying print data, and
   (ii) when a history of a print job that is determined by the determination unit to be based on information input from the mobile terminal is displayed on the display unit, control the display unit (a) to display information indicating the mobile terminal and (b) not to display information for specifying print data.

2. The apparatus according to claim 1, further comprising a log registration setting unit configured to set whether or not to cause the storage unit to store the history.

3. The apparatus according to claim 1, further comprising a log sending unit configured to send to the mobile terminal, out of the histories of the plurality of print jobs stored in the storage unit, the history of the print job based on information input from the mobile terminal, the mobile terminal being under communication with the apparatus, so as to cause the mobile terminal to display the history of the print job.

4. The apparatus according to claim 3, wherein the log sending unit sends the history of the print job based on information input from the mobile terminal to the mobile terminal, the mobile terminal being located at a shortest distance from the image processing apparatus, so as to cause the mobile terminal to display the history of the print job.

5. The apparatus according to claim 3, wherein the log sending unit sends the history of the print job based on information input from the mobile terminal to the mobile terminal, the mobile terminal being under communication with the apparatus, so as to cause the mobile terminal to display the history of the print job, wherein the print job is a print job most recently executed based on the information input from the mobile terminal.

6. The apparatus according to claim 1, further comprising:
   a deletion unit configured to delete a history of a print job stored in the storage unit; and
   a deletion setting unit configured to set a condition for the deletion unit to delete the history of the print job.

7. The apparatus according to claim 1, wherein the display unit displays the history of the print job that is determined by the determination unit to be based on the information input from the mobile terminal, which is under communication with the apparatus.

8. The apparatus according to claim 1, wherein the information for specifying print data is information indicating an acquisition source of the print data.

9. The apparatus according to claim 8, wherein the information indicating the acquisition source of the print data is a uniform resource locator (URL) of Web content.

10. The apparatus according to claim 1, wherein the display control unit controls, while the apparatus is communicating with the mobile terminal, to display a history of a print job based on information input from the mobile terminal being under communication with the apparatus, and not to display a history of a print job based on information input from another mobile terminal and a history of a print job based on information input from the operation unit of the image processing apparatus.

11. A method of controlling an image processing apparatus having a communication function with a mobile terminal, the method comprising:
- storing histories of a plurality of print jobs executed by the image processing apparatus;
- displaying the histories of the plurality of print jobs stored in the storing;
- determining whether each of the plurality of print jobs is a print job which is based on information input from the mobile terminal or a job which is based on information input from an operation unit of the image processing apparatus;
- controlling, when a history of a print job that is determined to be based on information input from the operation unit of the image processing apparatus is displayed, to display information indicating the image processing apparatus and information for specifying print data, and
- controlling, when a history of a print job that is determined to be based on information input from the mobile terminal is displayed, (a) to display information indicating the mobile terminal and (b) not to display information for specifying print data.

12. A non-transitory computer-readable storage medium which stores a program for causing a computer to function as an image processing apparatus having a communication function with a mobile terminal, the program causing the computer to function as:
- a storage unit configured to cause a memory to store histories of a plurality of print jobs executed by the image processing apparatus;
- a display unit configured to cause a display device to display the histories of the plurality of print jobs stored in the memory;
- a determination unit configured to determine whether each of the plurality of print jobs is a print job which is based on information input from the mobile terminal or a print job which is based on information input from an operation unit of the image processing apparatus; and
- a display control unit configured to:
- (i) when a history of a print job that is determined by the determination unit to be based on information input from the operation unit of the image processing apparatus is displayed on the display device, controlling the displace device to display information indicating the image processing apparatus and information for specifying print data, and
- (ii) when a history of a print job that is determined by the determination unit to be based on information input from the mobile terminal is displayed on the display device, controlling the displace device (a) to display information indicating the mobile terminal and (b) not to display information for specifying print data.

* * * * *

UNITED STATES PATENT AND TRADEMARK OFFICE
CERTIFICATE OF CORRECTION

| | |
|---|---|
| PATENT NO. | : 8,970,874 B2 |
| APPLICATION NO. | : 12/961940 |
| DATED | : March 3, 2015 |
| INVENTOR(S) | : Junichi Hiruma |

It is certified that error appears in the above-identified patent and that said Letters Patent is hereby corrected as shown below:

ON THE TITLE PAGE:

Please correct the Assignee name as follows:

(73) ASSIGNEE:

"Canon Kabuhiki Kaisha" should read --Canon Kabushiki Kaisha--

Signed and Sealed this
Seventeenth Day of November, 2015

Michelle K. Lee
*Director of the United States Patent and Trademark Office*